US012762041B2

(12) United States Patent
Goodman

(10) Patent No.: US 12,762,041 B2
(45) Date of Patent: Oct. 13, 2026

(54) GENERATING CONSTRAINTS IN A TARGET PROGRAMMING LANGUAGE FROM TRACES OF OPERATIONS SPECIFIED IN AN INPUT

(71) Applicant: Oracle International Corporation, Redwood City, CA (US)

(72) Inventor: Daniel Goodman, Bagillt (GB)

(73) Assignee: Oracle International Corporation, Redwood City, CA (US)

( * ) Notice: Subject to any disclaimer, the term of this patent is extended or adjusted under 35 U.S.C. 154(b) by 174 days.

(21) Appl. No.: 18/770,219

(22) Filed: Jul. 11, 2024

(65) Prior Publication Data

US 2025/0147743 A1 May 8, 2025

Related U.S. Application Data

(60) Provisional application No. 63/597,201, filed on Nov. 8, 2023.

(51) Int. Cl.

| | |
|---|---|
| ***G06F 11/362*** | (2025.01) |
| ***G06F 8/30*** | (2018.01) |
| ***G06F 8/41*** | (2018.01) |
| ***G06F 8/75*** | (2018.01) |

(52) U.S. Cl.

CPC ............ *G06F 11/3636* (2013.01); *G06F 8/30* (2013.01); *G06F 8/427* (2013.01); *G06F 8/433* (2013.01); *G06F 8/447* (2013.01); *G06F 8/452* (2013.01); *G06F 8/75* (2013.01)

(58) Field of Classification Search

CPC . G06F 8/30; G06F 8/427; G06F 8/433; G06F 8/447; G06F 8/452; G06F 8/75; G06F 11/3636

See application file for complete search history.

(56) References Cited

U.S. PATENT DOCUMENTS

| | | | | |
|---|---|---|---|---|
| 6,556,960 | B1 | 4/2003 | Bishop | |
| 6,557,011 | B1 | 4/2003 | Sevitsky | |
| 8,397,217 | B2 * | 3/2013 | Goryachev | G06F 11/3668 717/124 |
| 8,402,444 | B2 * | 3/2013 | Ball | G06F 8/43 717/124 |
| 8,656,349 | B2 * | 2/2014 | Lochmann | G06F 8/74 104/106 |

(Continued)

OTHER PUBLICATIONS

U.S. Appl. No. 18/770,230, filed Jul. 11, 2024, Daniel Goodman.

(Continued)

*Primary Examiner* — Douglas M Slachta

(74) *Attorney, Agent, or Firm* — S. Scott Foster; Kowert, Hood, Munyon, Rankin & Goetzel, P.C.

(57) ABSTRACT

Constraints may be generated in a target programming language from traces of operations specified in a source input. Operations specified in an input, such as a data structure like a Directed Acyclic Graph (DAG) or source programming language, that access data may be traced. Based on the traces, a code template may be generated in a target programming language or data structure to test the operations of the traces to determine which traces are valid in order to add a portion of code in the target programing language that allow external code to be run only on valid traces.

20 Claims, 12 Drawing Sheets

(56) References Cited

U.S. PATENT DOCUMENTS

| | | | | |
|---|---|---|---|---|
| 8,745,641 | B1 * | 6/2014 | Coker | G06F 11/3668 719/318 |
| 8,775,155 | B2 | 7/2014 | Roth | |
| 9,064,046 | B1 * | 6/2015 | Cormier | G06F 11/0778 |
| 9,104,961 | B2 | 8/2015 | Gordon | |
| 9,317,266 | B1 * | 4/2016 | Muldoon | G06F 8/51 |
| 10,210,077 | B2 * | 2/2019 | Wang | G06F 11/3688 |
| 10,545,730 | B2 * | 1/2020 | McCune | G06F 8/30 |
| 11,397,794 | B1 * | 7/2022 | Baghani | G06F 21/44 |
| 2008/0235671 | A1 * | 9/2008 | Kellogg | G06F 9/45529 717/139 |
| 2009/0249305 | A1 * | 10/2009 | Li | G06F 11/3676 717/130 |
| 2011/0307956 | A1 | 12/2011 | Yermakov | |
| 2014/0172347 | A1 | 6/2014 | Gavish | |
| 2015/0095277 | A1 | 4/2015 | Tristan | |
| 2017/0371764 | A1 * | 12/2017 | Haiderzaidi | G06F 11/3612 |
| 2020/0349063 | A1 | 11/2020 | Brebner | |
| 2021/0318858 | A1 | 10/2021 | Zu | |
| 2022/0179627 | A1 | 6/2022 | Bagadia | |

OTHER PUBLICATIONS

U.S. Appl. No. 18/770,238, filed Jul. 11, 2024, Daniel Goodman.

Tobias Kuipers, et al., "Object-oriented tree traversal with JJForester," Elsevier, Sciences of Computer Programming 47, 2003, pp. 59-87.

Jakub Misek, et al., "Mapping of Dynamic Language Constructs into Static Abstract Syntax Trees," Published in: 2010 IEEE/ACIS 9th International Conference on Computer and Information Science, pp. 625-630.

* cited by examiner

```
....
for(int i_new=0; i_new < i_end; i_new++) { for(int
   j_new=0; j_new < j_end; j_new++){
      if(!(i_new == i_1 && j_new == j_1) && !(i_new == i_2 && j_new == j_2)) {
         for(sampleIndex=0; sampleIndex < 2; sampleIndex++) {
            boolean sampleValue_new = sampleIndex == 1;
            double scopeProbability = previousProbability *
            sampleSateProbability[sampleIndex];
            constraint from trace {
               [Scope for future constraints or user code]
            }
         }
      }
   }
}
....
```

FIG. 9

GENERATING CONSTRAINTS IN A TARGET PROGRAMMING LANGUAGE FROM TRACES OF OPERATIONS SPECIFIED IN AN INPUT

RELATED APPLICATIONS

This application claims benefit of priority to U.S. Provisional Application Ser. No. 63/597,201, entitled "Compiling Probabilistic Models Described In A Probabilistic Programming Language Into A Non-Probabilistic Programming Language," filed Nov. 8, 2023, and which is incorporated herein by reference in its entirety.

BACKGROUND

Field of the Disclosure

This disclosure relates to code evaluation techniques.

Description of the Related Art

Compilation techniques involve analysis of inputs specified in specified in formats such as programming languages, api calls, or data structures such as a directed acyclic graph (DAG), a source, in order to produce target artifacts, such as code in target programming languages, executable instructions, or other information that can be used to used to perform operations. Examples of these operations include executing operations specified in a source programing language like in C, deriving relationships between entities like in ProLog, or querying properties of a Bayesian model described in a probabilistic programming language like in BUGS. Various different techniques can be applied to analyze and produce target artifacts. Techniques that improve or enable the production or quality of target artifacts are highly desirable.

SUMMARY

Techniques for constructing code templates in a target language based on traces of operations linking entities are described. These traces maybe provided in a number of ways including a Direct Acyclic Graph (DAG) like structure, or a multitude of input types that could be trivially converted to such a structure including source languages and API calls. Traces of operations specified may be generated that access data between a start node and an end node, where the operations include put operation(s) using a put index variable to set a value in an entry in an array get operation(s) using a get index variable to obtain the value from the entry in the array, and conditional assignments where the value assigned is determined by a Boolean guard expression. Based on the traces, a code template may be generated in the target programming language to test the operations of the traces. A valid trace in the traces may identified by identifying between the start node and the end node conditional guards which may be true or false according to a conditional branch the trace took and by pairing corresponding ones of the put operation(s) and the get operation(s) and testing for equivalence of index values calculated for the put index variable and the get index variable in respective contexts of the put operation(s) and the get operation(s), where the pairing of the corresponding put operation(s) and the get operation(s) and the respective contexts are determined according to at least a forward pass and a backward pass respectively performed over individual ones of the traces to construct a set of scope and variable substitutions that test for equivalence of the index values in the paired corresponding ones of the one or more put operation(s) and the one or more get operation(s) and conditionals in the trace to identify if a trace is valid. Within the template to identify a valid trace, a portion of code may be added in the target programming language into the set of loops that prevents execution of further code placed in the code template for additional valid traces.

BRIEF DESCRIPTION OF THE DRAWINGS

FIG. 9 is an example of code used to explore possible values of a distribution sample task, according to some embodiments.

Figure 1:
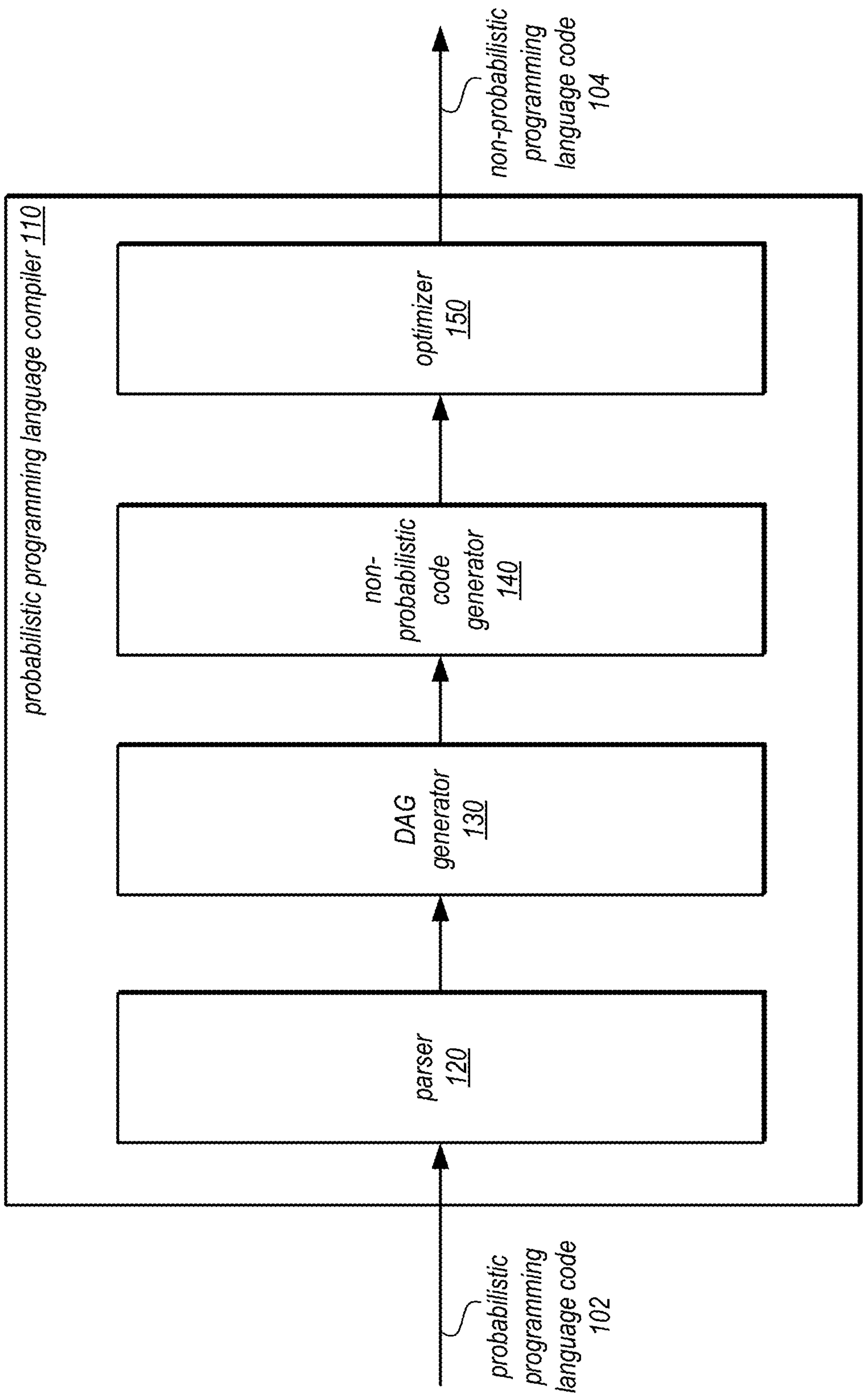
FIG. 1 is a logical block diagram of a probabilistic programming language compiler, according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (e.g., meaning having the potential to) rather than the mandatory sense (e.g. meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Various techniques for enforcing and exploring relationships between entities in a program or model are described herein. One set of these embodiments are those used as component steps when compiling models described in a probabilistic programming language into a non-probabilistic programming language, although other embodiments may apply these techniques to other types of input. Accordingly, the following examples that discuss the application of various techniques respect to probabilistic programming languages are not intended to be limiting.

Probabilitic programming is beneficial in many scenarios because while deep learning models have advanced many tasks, they typically require large amounts of data, and it is hard to encode domain specific knowledge into them, or explain how they reach their results. For these reasons, domain experts may choose to construct explicit probabilistic models. Typically these models can be easily described, but implementing them requires the user to construct custom inference code. This is labour intensive and potentially error prone. The considerable effort acts as a deterrent to modifying the models for either general development or domain specific targeting.

Probabilistic programming addresses this problem by providing a high-level means of describing the model, typically through a language or through an API embedded in another language. Models described in probabilistic programs have the operations by which the values of the model are inferred provided by the compiler or API, saving the user from this error prone work, and reducing the burden of adapting models.

In various embodiments, a new probabilsitic programming language is described that provides for compilation into a non-probabilsitic programming language, such as Java™, which provide an object-oriented interface. For example, the new probabilistic programming language may compiles models to JVM classes that encapsulate the complexity of the different model operations, providing the user with a clean Object-Oriented interface. The language is single assignment, but designed to be familiar to programmers of non-probabilistic machine learning models, making models more accessible to the developer community. Models constructed in the new probabilistic programming language perform three classes of operation: Value inference, where the value of any variables that are not fixed can be inferred; Probability inference, where the probabilities of individual parameters and the whole model can be estimated; Conventional execution, which can be used to generate outputs from a trained model in cases such as linear regression or to produce synthetic data sets. The values of variables within the model can be fixed at compile time or at run time.

Value inference may, in some embodiments, be performed through Gibbs sampling using conjugate priors (when possible) and reverting to marginalising out sampled variables for finite discrete distributions, and localised Metropolis-Hastings inference for unbounded or continuous distributions. The results of this inference can be: all the sampled values modulo any requested burning in and thinning; the value when the model was in its most probable state (Maximum a Posteriori, MAP); or no values saved. These policies are set for the whole model and can be modified on a per variable basis.

In various embodiments, probabilistic models may include parameterised random variables, constant parameters supplied by the user, and relationships between the variables, parameters and data. Random variables encapsulate simpler probability distributions which can be easily sampled from producing values. The values of the random variables and the values sampled from them can be inferred in a variety of ways.

For example a random variable representing a Uniform distribution parameterised with the values 0 and 1 will when sampled provide values in the range [0 . . . 1] with uniform probability, and will not provide any values outside of this range. This sampled value can then be used as an input to another random variable. If it is used to parameterise a Bernoulli distribution, it could represent the bias of a coin.

Repeated sampling from the Bernoulli distribution provides values that represent repeated flipping of the coin. If a set of observed results of flipping a real coin is then provided, the value inference can be used to determine the most like bias of the coin and the variance of this value. For this simple model a closed form solution exists rendering the probabilistic model unnecessary, but for more complex models such as the one used as an example discussed below, this may not be the case.

FIG. 1 is a logical block diagram of a probabilistic programming language compiler, according to some embodiments. Probabilistic programming language compiler 110 may be implemented as a standalone compiler on a single system or as part of a larger service, such as service accessed via network requests to a server or other computing resource hosted by a cloud computing provider. FIG. 12 illustrates an example computing system 2000 upon which probabilistic programming language compiler may be implemented. Probabilistic programming language compiler 110 may implement the various techniques discussed in detail below with regard FIGS. 2-11 using one or more components.

One example arrangement of components that probabilistic programming language model compiler may implement is shown in FIG. 1. Probabilistic programming language code 102 is received (e.g., entered via a text editor or other interface or uploaded or otherwise provided as one or more files to probabilistic programming language compiler 110). A parser, such as parser 120, may perform one or more parsing techniques to evaluate code 102 and may tokenize or represent the probabilistic programming language as one or more data structures for later processing (e.g., abstract symbol trees).

DAG generator 130 may evaluate the output of parser 120 to generate a DAG for a probabilistic model described in code 102 according to the various techniques discussed below. Non-probabilistic code generator 140 may perform a first pass or first version generation of code in a non-probabilistic programming using various techniques discussed below (e.g., as discussed with regard to FIGS. 2-9). Optimizer 150 may implement various techniques for transforming or otherwise optimizing the performance of the first version of the non-probabilistic code, in some embodiments, such as through the techniques discussed below with regard to FIGS. 10 and 11. The non-probabilistic programming language code 104 can then be provided for further display, editing, or compilation and execution, in various embodiments.

Some of the techniques below may be broadly applicable when compiling from a source programming language to a target programming language, including other languages than probabilistic programming languages as the source, for instance. Accordingly, a compiler similar to probabilistic compiler 110 may perform these techniques and may include similar features, such as parser 120, a code generator, and optimizer. While many examples discussed below describe the applicability of techniques with respect to compiling probabilistic programming languages, such examples are not intended to be limiting the application of these techniques to other scenarios, including the compilation of non-probabilistic programming languages.

The new probabilistic programming language is a probabilistic programming language with single assignment semantics. It supports "for loops", "conditionals", "scope blocks", and other features of single assignment semantics. Probabilistic models described in the new probabilistic programming language can be represented as a Directed Acyclic Graph (DAG) where the nodes in the graph are "Variables" and "Tasks".

Tasks may consume some number of variables (including consuming 0 variables in some scenarios) and produce at most one variable. Accordingly, in various embodiments, all variables may have a single producer task. There are 3 types of variable, "Random Variable", "Scalar Variable", and "Array Variable". All tasks and variables may have a unique integer ID. These unique integer IDs may be monotonically increasing allowing both tasks and variables to form a total order.

Each task and variable may have a "Scope" assigned to it. Each scope (with the exception of the outer most scope which we call the "Global Scope") may have a scope that is equal to or a parent of the scope of their constructing tasks scope. Variables with scopes that are outside of the task scope are created when the variable is declared in a different scope to where it is set. In the DAG representing a probabilistic model, on any given path through the DAG, once a scope has been left by a creating a task in one of the parent scopes, or in a new scope embedded in one of the parent scopes, the previous scope cannot be reentered. The creation of scopes may be a total order across all paths through the DAG.

With single assignment semantics, for "for loops" to perform a useful function it may be necessary to have arrays to store the values generated by each iteration of the loop. Each element of the array can be set only once, but they do not all need to be set at the same time. This presents the need to be able to encode the progression of the states in the array into the DAG, and this encoding is done by the put task that take an array a, an index i, and a value v, and sets i'th element of a to the value v (a[i]=v). The output of this task is a new array variable representing the new state so it is know that tasks that consume the array after this point will see the array with the i'th value set. By keeping a reference to prior and future instances of the array variable, a doubly linked list is created of all the operations that alter the state of the array. When a value is set in a multi-dimensional array, an implicit put operation is made into each of the higher dimension arrays to ensure that the history is maintained in the higher dimension arrays too. This does not cover all scenarios as a single array value can represents multiple array states constructed over multiple iterations of a loop. For example, Example Code 1 described below will read from the first put to a (a[0]) in the first iteration, and the second put to a in all later iterations of the loop. The handling of this issue and the many other challenges that are created by the differing states of arrays will be discussed in detail below.

Below is Example Code 1:

```
a[0] = RandomVariable1(v).sample( );
for(int i=1; i<a.length;i++)
   a[i] = RandomVariable2(a[i-1]).sample( );
```

In Example Code 1, an array is populated and read from with values sampled from an unspecified random variable. This results in multiple instances of the array being constructed, and in this example they are structured in such a way that some of the put operations occur later in the DAG than the corresponding get operations.

To construct the probabilistic model represented as a DAG, the following discussion may describe how the DAG is converted into code that represents the probabilistic model. The code at this stage of the process may be represented in an intermediate representation as one or more trees. These intermediate trees are in one of 2 types, "IRTreeVoid" and "IRTreeReturn" depending on whether the tree returns a value or not.

When compiling the DAG into a model an object of type, "CompilationContext" is a data object used to hold all the details of the compilation process. Various elements of the CompilationContext object are described in detail below.

When generating code to represent the model, it may not be desirable to save a variable for every value in the model. Many of these values may not be named, and the model user may not want to access them. Therefore, storing them would only increase the space requirements of the model and cause unnecessary memory accesses. For example, the variable resulting from the subtraction of the constant 1 from the variable i in Example Code 1 may be a scenario where it is not desirable to save a variable. As such only the following values are saved in some embodiments:

- Named public variables in the models (this does not include loop indexes that are implicitly private)
- Arrays regardless of their visibility.
- Variables output from sample tasks if there is no array or public variable that will hold the unmodified value.

These saved variables may be called "intermediate variables". When variables are created inside "for loops", an array is created in the generated code to hold each instance of the variable.

Variables in the DAG may have a method called "getForwardIR" that will generate an intermediate tree representation of the code used to generate that value in the DAG from the intermediate variables that it depends on. In the base case, this may work by calling getForwardIR on the task that generated the input. This then calls getForwardIR on the variables the task took as inputs to get the subexpressions that generate the inputs. The subexpressions are then added to the tree elements required to describe the parent task of the variable. When an intermediate variable is met, the value is read directly from the model. If an observed variable (a variable whose value is fixed to the value of another variable in the model) is met, getForwardIR is called on the other variable that was observed to set the value of this observed variable.

In various embodiments, this code represents a single expression, and so may be limited in the nature of the things it can represent. For example, it cannot represent that a variable is in a "for loop", and while it can contain a get from an array, it cannot represent the proceeding "puts" that added the value to the array. To handle the first issue, a structure in the compilation context that takes a tree and a scope, and adds the tree to the scope so that at a later point a complete tree that holds all the trees in the scopes they were added to may be used. Detailed discussion of this technique is provided below. The second issue may be handled by the set of "intermediate" variables whose value is kept in the model. Calling getForwardIR on these variables will always read the value from the model, but also results in context specific additional actions. If the getForwardIR method is called as a result of an earlier call to the method, nothing further is done. However, if the method is called directly, then this call will result in the tree required to generate the model state being constructed and added to the scope tracking before the load is performed. Variables whose value is not dependent on the output of any random elements of the model may be flagged as deterministic during the traces generation phase described in detail below, and intermediate variables with these values may be set when the model is initialized.

Intermediate representation trees can be generated in a number of different ways. These trees may then be combined to create a single tree including any required loops, conditionals, etc. This is done in a "ScopeTracking" object that is accessed through the compilation context. These are held in a stack so that if during the creation of one part of a function there is a need to create another part, the scope tracking can be pushed to allow another tree to be created. This tree can then be recovered, and once the stack has been popped to recover the earlier ScopeTracking object the newly constructed tree can be added to this.

The ScopeTracking object itself contains a tree of "ScopeDesc" objects. Each object may have the following as properties:

- scope—The scope that this ScopeDesc object represents.
- scopeTree—The IRTree that represents the scope. This is created by a call to the scope object.
- scopeBody—The IRTree node within the scope that trees added to the scope should be added to. Normally IRTrees are final once they are constructed, but this trees type is IRProxyTreeSeq, a special node type that is created just to allow trees to be added at a later point in the compilation.
- enclosingScope—The ScopeDesc that represents the scope that encloses this scope. This is null for the root node.
- taskCount—A count of the number of tasks currently placing code into this scope or one of its subscopes. This is used to allow a happens before relationships to be enforced.
- initialTrees—A list of IRTrees that have to occur before any subscopes are reached.
- subScopes—A list of SubScopeDesc objects that represent the subscopes. They contain the ScopeDesc that represents the subscope, and any trees that should appear after that subscope, but before the next subscope.

There is also a map from Scopes to ScopeDescs to make finding the correct node in the tree efficient. The root of the tree is the "GlobalScope", the outer most scope in the DAG, and this scopeDesc is created when the object is constructed.

In various embodiments, when a new scope is added, a new ScopeDesc object is created for the scope. This takes the "enclosingScopeDesc" as an argument. So, if this scope has not yet been added, a recursive call is made to add that scope first. To add the ScopeDesc of the scope into the ScopeDesc of the encompassing scope, the list of subScopes is examined to find the index of the first subscope that has tasks actively adding scopes or trees to it, or the size of the list (if none of the subscopes are currently being augmented). The new subscope is then inserted into the position immediately before this position, moving all proceeding subscope descriptions down one place. This allows subscopes to be added to occur before other scopes in the scope tracking in a controlled way.

In various embodiments, when a new tree is added, the position of the first active subscope is found in the same way, and the tree is added to the subscope preceding this, or into initialTrees if the first subscope is active. In some embodiments, an alternative approach to adding trees is to provide a task as well as the tree and the scope, so that the tree can be placed in the last scope that was created before this task. This is done by comparing the id's as these are strictly monotonically increasing.

When the complete tree is extracted it is copied and all the subscopes and trees are merged together into a single tree.

Having constructed the DAG, the next step is to explore the DAG to identify features of interest. In various embodiments, the first step is to generate a set of all the variables in the DAG, as variables store both tasks that they are inputs to and their parent task, and tasks store their produced variable (if any) and their inputs. The DAG may be doubly linked, allowing all variables in a connected part of the graph to be identified via a simple search. Starting with a set that contains every variable named in the outer most scope of the DAG, all variables in the DAG may be identified.

In some embodiments, once a set of all variables has been constructed, the DAG may be examined for variables of interest. This set includes the following:

- Observed variables—Variables whose value has been pinned to being the same as another variables. For example variable x observes variable y. Typically variable y will be a model input and variable x will be constructed by sampling from a Random Variable.
- Random variables.
- Terminal Variables—Variables that are not directly observed, but have no consumers.

Having located these variables of interest, the technique may now ascertain where in the graph these values inputs came from, in some embodiments. Specifically, traces from sample tasks, model inputs, and constants to the parent tasks of any of these variables may be looked for. These traces may be constructed by a depth first search starting at the variable and recursing backwards through the tree, building up the trace in reverse order in a "trace description object". When a sample task, input, or constant is reached, the trace in the description trace description object is copied and reversed before saving.

In various embodiments, the structure of a trace description object may be a list of pairs representing the operations that were performed on a variable as it traversed the DAG. The pairs in the trace may contain (i) the task that performs the operation on the variable and (ii) an integer to mark which input to the task the variable was. The first pair in the trace may be the task that constructed the variable for the trace, and so the input argument is undefined for the first element.

As an example, a trace description object for a trace on Example Code 1 may be:

(randomVariable1.sample, 0)
(put a[0]), 2)
(get a[i−1],0)
(construct randomVariable2, 0)

This starts with the sample task that generates the initial variable, then the value is put into the array a so has an argument position of 2. The arguments into a put task are 0: the array, 1: the index, 2: the value. The resulting array variable is then passed to the get task as argument 0, and the resulting variable is then passed to the constructor for randomVariable2.

For traces that go only via scalar variables, the set of trace may be complete without any further work. However, in some embodiments, the situation may be more complex if conditionals are added to models, or when handling data that goes via one or more arrays. The "get" operation that recovered the value from the array may be known, but the "put" operation that added the value to the array could be any of the "put" operations that occurred before the get operation, and any put operation that happens after that point in a scope containing the get operation that can iterate. For example, the second put in Example Code 1 is used by the get operation on the next iteration of the loop, but because the number of iterations is a runtime value, the DAG is constructed on a single pass, and the second put appears after the first put in the DAG.

To address this issue, instead of constructing a single trace which is always valid, a set of traces may be constructed. Only one trace of the set of traces may be valid for a given state of the scopes at the end of the trace, but multiple traces of the set of traces may be valid over the course of an execution. For example, in Example Code 1 there are 2 possible traces, one which is the direct trace that goes to the put operation before the get and is valid when i is equal to 1, and the second trace goes to the put operation after the get and is valid for i–[2..a.length). Which trace is valid in a given situation, is determined by comparing the put and get indexes, as discussed in detail below.

To construct these sets of array traces, the depth first search may be started in the standard way, but when put and get tasks are reached, instead of just performing the depth first search, additional steps are included to allow the search to be extended beyond the inputs of the task.

For a get task, the additional steps using a field in the trace description object to store the first get task in a segment of the trace that interacts with a given array. If this value has not been set when the trace reaches a get task, this get task is the start of the interaction with the array and the value is set to the current get task before the search continues to explore the array variable. This allows the put task later in the trace construction to determine the scope and relative position of the get task in the DAG. When the index variable is explored, to prevent the creation of multiple equivalent traces via different paths through implicit put get pairs, the get task also checks if the last task in the traces was the corresponding implicit put task. If it was, it returns without continuing the search from this task.

For a put task, the additional steps may have a more complex alteration, as the reverse traversal of the DAG when constructing the trace means that for each get task, all the possible put tasks have to be considered. For example, a method may be provided in the "ArrayVariable" class that takes a scope and a task id and returns a set containing all the possible array instances whose parent could have set the value that the get task returned. This is achieved by traversing the possible array states from the first to the first that could not be paired with the consumer task. Initially this may be achieved by comparing the id of the task that generated the array instance with the id of the consuming task. If the id places the constructing task before the consumer in the DAG the variable is added to the set. If a task is reached that appears in the DAG after the consuming task it may be necessary to determine if one of the encompassing scopes supports iteration such that the generated variable could reach the consumer. To determine this, first the common scopes between the consuming and producing tasks are calculated. If any of these scopes is iterative, then the array instance is added to the possible set and the next array instance is tested. This process continues until there are either no further instances to consider or an array instance is reached which could not be an input to the consumer. Once this has happened, all further instances also cannot be inputs to the consumer.

The trace construction method in the put task then works as follows for each of the inputs:

- array—The trace description object contains a flag to indicate if this is the first put operation for this array, this is initially set to true. If this flag is true, all possible input arrays are computed and the first put flag is set to false. Trace generation is then called for each possible array. The put task is not added to the trace when considering the array as it makes no modifications that effect the element of the array of interest.
- index—As indexes are integers, at the point the trace starts exploring the index it must be leaving the array it was considering, so the value of the first put flag is restored to true as this trace is no longer located within this array, and the trace generation continues as normal;
- value—Values can be either array or scalar variables. if they are scalar they are handled in the same way as the index, if they are an array, then updates to the input arrays are also of interest, so again the set of all possible arrays is computed, and the trace generation called on each of these possible arrays.

To prevent infinite loops in trace generation, a set of seen variables is maintained, though this could be simplified to a set of seen put tasks.

In various embodiments, traces may not be allowed that would require multiple iterations of a loop acting on an array. In such embodiments, each array could only appear in a trace once per loop iteration as otherwise the runtime code would have to consider $$O\prod_{i=0}^{n} a_i.$$

length combinations for n arrays. This may not be tenable in some embodiments. To enforce this restriction, two properties may be maintained.

As for the first property, for single assignment semantics, the combination of implicit and explicit put task indexes may have to make reference to all the values provided by the iterating scopes from the array declaration to the put task. If this were not true, when the loop iterated on one of the unused values, the same index to the put task would be written to for a second time. For example in the code below, it is necessary that the put uses j and k, but not i as the array is declared inside the for loop that generates i.

```
for(i:[0..n)) {
  int[ ] a = new int[n*n];
  for(j:[0..n)) {
    for(k:[0..n))
      a[j*n + k] = f(i, j, k);
  }
}
```

This condition may be necessary, but not sufficient to enforce single assignment semantics on arrays as "a[input[j][k]]=f(i,j,k);" would also be a valid assignment. But if input is an input to the model, there is no way to guarantee that every entry in input is unique.

As for the second property to be maintained, when constructing traces, a get task may not use a scope value already used in a put operation on the same array already in the trace. As traces stop at sample tasks, this does not prevent the code in Example Code 1, but does prevent code such as:

```
a[0] = 0;
for(i:[1..n))
  a[i] = a[i−1];
```

which would require n−1 iterations of the loop to pass the data from a[0] to a[n−1].

As noted above, the probabilistic programming language may be a single assignment language. This makes handling relationships between variables that are scalar values straightforward, the relationships can be read directly from the DAG as any constructible trace may be valid. If, however, the variables are not scalar, such as array variables, direct reading may not be possible.

Figure 2:
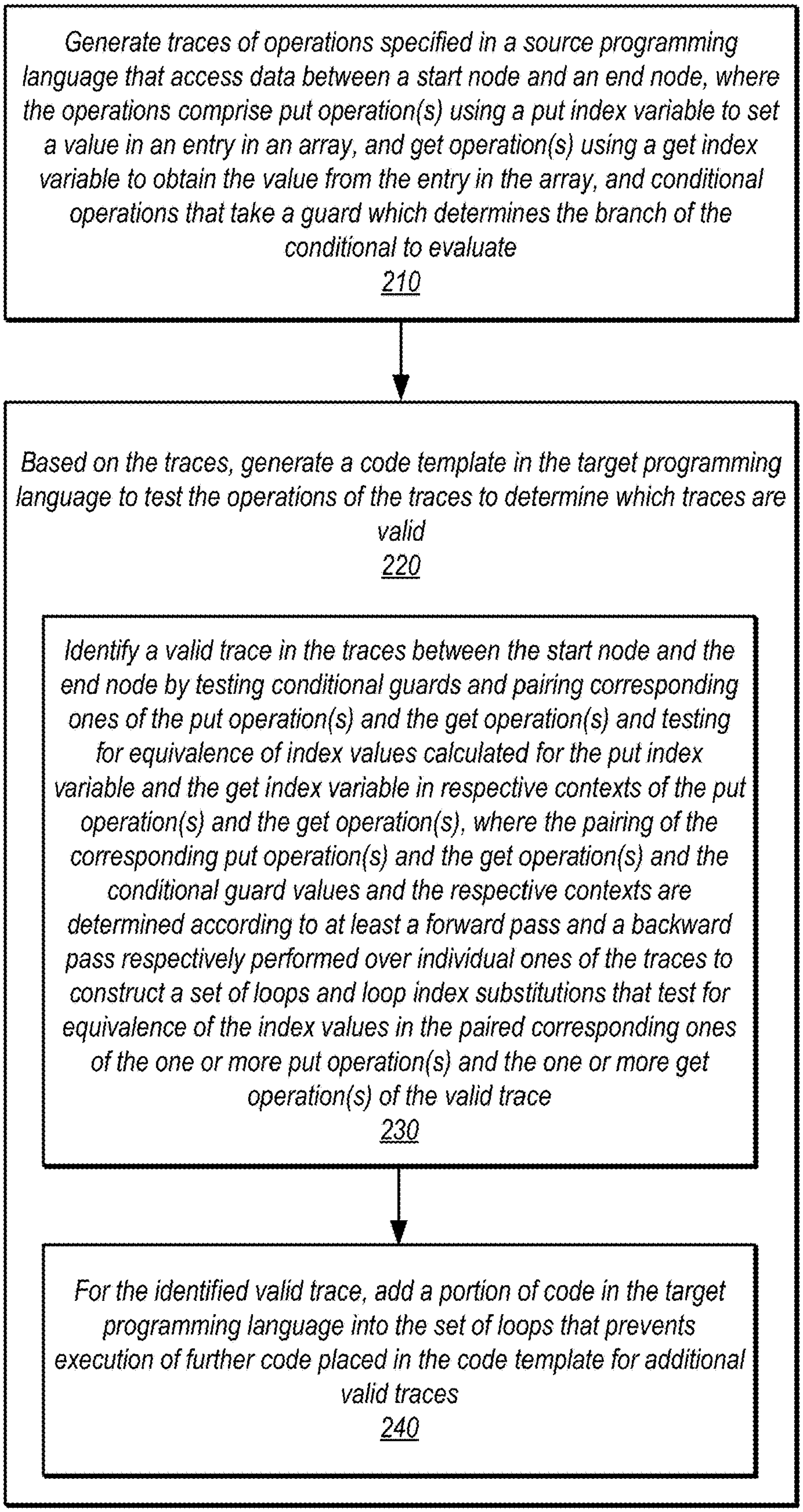
FIG. 2 is a high-level flowchart illustrating various methods and techniques to generate code templates in a target programming language to test for valid traces of operations that access an entry in an array, according to some embodiments.

FIG. 2 is a high-level flowchart illustrating various methods and techniques to generate code templates in a target programming language for identifying valid traces of operations that access an entry in an array, according to some embodiments.

As indicated at 210, traces of operations specified in the source programming language that access data between a start node and an end node may be generated, in some embodiments. The operations may comprise put operation(s) using a put index variable to set a value in an entry in an array and get operation(s) using a get index variable to obtain the value from the entry in the array. For example, the operations may be specified as a sequence of operations performed on a piece of data between being read at a start node, and returned at an end node.

As indicated at 220, based on the traces, generate a code template in the target programming language to test the operations of the traces, in some embodiments. The code template may identify a valid trace in the traces between the start node and the end node by identifying conditional guards and pairing corresponding ones of the put operation(s) and the get operation(s) and testing for equivalence of index values calculated for the put index variable and the get index variable in respective contexts of the put operation(s) and the get operation(s). Identifying and constructing tests for conditional guards, pairing the corresponding put operation(s) and the get operation(s) and the respective contexts are determined may be performed using at least a forward pass and a backward pass over individual ones of the traces to construct a set of scope and variable substitutions to test the equality of the indexes in the paired corresponding ones of the one or more put operation(s), and conditionals, and the one or more get operation(s) and of conditionals in the trace to identify if a trace is valid.

After constructing the part of the template to identify if a trace is valid, add a portion of code in the target programming language into the constructed template to record this trace as valid and prevent execution of further code placed in the code template for additional valid traces, as indicated at 240, in some embodiments.

Further details of the above method are discussed below. For example, in various embodiments, arrays present the ability to have multiple traces to or from a given point in the DAG. To determine which of these traces is valid for a given configuration of the "for loop" index values, conditions may be applied to ensure that all the pairings of puts and gets have matching index values and conditional guards have the correct value. This situation may be made more complicated as those index values may be constructed in different scopes to the currently constructed start or end point of the trace, and may involve the currently constructed scopes, but on different iterations of a loop. This means that it may be necessary to build up additional scopes while constructing the tests within the current scopes, to ensure that the trace is valid before proceeding to construct further scopes and tests.

To address this, a class "TraceArrayRestrictions" may be implemented that has methods that take a trace, and any for loops that have already been constructed at the start and end of the trace. Using these it constructs all the required scopes and guards to create a link from the scope of the task at the start of the trace to the scope of the task at the end of the trace. The resultant scope can then be used as a target for code as described above.

Various supporting techniques for a trace may be implemented. Substitutions is one example of a technique that may be implemented. The "CompilationContext" class, discussed above, may include the ability to set substitutes for variables and scopes. These substitutions work via stacks so that when a new substitution to a variable or scope is added, the new substitution overwrites any existing substitution, and when the substitution is removed the previous substitution is restored.

Stacking "for loops" is another example of a technique that may be implemented. The implementation of substitutions mean it is possible to construct additional "for loops" that represent the different possible states of the "for loops" in the DAG when considering different parts of the trace. Starting with the already defined scopes, when a "for loop" is met that is either not one of the existing loops, or could be in a different iteration of an existing loop, a "new for loop" is created inside the existing loops and a substitution added so that future calls to either the loop when adding trees to the compilation context, or calls to the loop index map to the new for loop or the new for loops index respectively.

Paired array operations are another example of a technique that may be implemented. Stacking "for loops" can create an exponential number of iterations of the inner loop body. However, for any given trace, corresponding pairs of put and get operations can be constructed. Accordingly, for each of these pairs, the values of the indexes may have to be equal. This observation allows a guard to be inserted in the scope containing the get task to prevent execution continuing if the indexes do not match up. Substitution can then be used to ensure that the scope created by the conditional now replaces the scope represented by the for loop. In many cases these guards can be used in optimizations to remove "for loops", replacing them with a declaration of the index equal to the only value that would satisfy the guard, and a conditional to ensure that value was a valid index for the "for loop" to generate.

Using these techniques it is possible to build up a scope whose body will only be executed if the trace is valid for the provided scopes.

The following example, may further illustrates some of the techniques discussed above. In Example Code 1 above, there are 2 traces generated from the constructor of RandomVariable2. The first is:

(RandomVariable1.sample, 0)
(put a[0]), 2)
(get a[i−1],0)
(construct randomVariable2, 0)

This starts with the sampling of RandomVariable1, and the corresponding put and get operations to reach the constructor argument of RandomVaribale2. The second is:

(RandomVariable2.sample, 0)
(put a[i]), 2)
(get a[i−1],0)
(construct randomVariable2, 0)

This starts with the sampling of RandomVariable2 and goes via the corresponding put and get operations to reach the constructor argument of RandomVaribale2 in a later iteration of the loop. If a constraint were to be constructed for the second trace to determine if the sample from the instance of RandomVariable2 in iteration i is an argument to a later instance of RandomVariable2, then the following example code (Example Code 2) may be generated.

The following example of code (Example Code 2) is generated by a trace restriction method. The variables names have been simplified for clarity, but could be constructed to ensure that they are unique and do not result in name collisions, in various embodiments.

```
//Provided scope
for(int i=1; i<a.length; i++)
//Constructed for loop to search for possible values of i
//that would allow the sample value to be an argument
//to a later iteration.
for(int i_1=1; i_1<a.length; i_1++)
   //Guard to test if the trace is valid to this point.
   if(i == i_1-1) {
   //Scope for code that will only be executed if the trace is
   //valid
   }
```

The following discussion provides an example technique for constructing restrictions for traces. For instance, TraceArrayRestricts may take the following inputs:

One input may be the "trace." The trace may be the trace that the restrictions are to be constructed for.

Another input may be "rawTraces." rawTraces may be a set that contains all the traces that the trace argument is derived from. In the simplest scenario this may just be the trace argument, but as constraints are only dependent on the tasks that interact with arrays and conditionals, it is possible for multiple traces to map to the same constraints. To prevent this it is often desirable simplify the trace to just the start, end, conditionals, and tasks that interact with arrays. For the default use case this presents no problems, but if the "passValues" flag is set then the values that need to be passed may have to be identified. For this reason, all of the original traces may be required.

Another input may be "existingStartScopes". existingStartScopes may be a Map from any "for loops" that have already been constructed for the start of the trace to the IntVariable used as their index. As multiple instances of a single for loop in the original DAG may be constructed this index does not have to match the index in the for loop, but should be substituted for it.

Another input may be "existingEndScopes". existingEndScopes may be similar to existingStartScopes, but for the end of the trace.

Another input may be "target". The "target" may be the scope description to build the required restrictions in.

Another input may be "globalID". The globalID may be a unique integer value used to ensure variable names created in the restriction are unique.

Another input may be "passValues". passValues may be a Boolean flag to mark if values constructed in the trace that would alter the models state, should be constructed locally and have substitutions set to use the newly constructed values. This can be used for a number of things, but the main use relates to the handling of distributions (as discussed in detail below).

Another input may be "compilationCtx". compilationCtx may be the compilation context that this code is being constructed in.

The following is an example description of a technique to construct a constraint from a trace. Some of the steps in this algorithm could be merged to reduce the number of passes through the traces, but they are kept separate for clarity:

The first step is to construct a map of put tasks that insert data into an array and their corresponding tasks that recover the data from the array. Each put will have at most one corresponding task. The mapping is constructed by traversing the trace from the consumer to the producer, and each time a get or reduction input task is met, if the remainder of the trace is providing the array to the task, the task is pushed onto a stack. For each put that is met if the stack of tasks is not empty, the top task is popped off the stack and placed in the a map with the put task as the key. Pairings are constructed in this way to ensure that when there is a sequence of puts with a following sequence of gets, the gets are paired up in the correct order.

The second step is, if the pass values flag is set, determine any values in the model that would be calculated and set as the trace executed. This is done by passing through the traces in rawTraces collecting a set of intermediate values. Every time a put task is met all the values in the set are added to the set of values to be constructed before that put tasks value is constructed, and the set is emptied. Any values in this set at the end of the trace are assigned to the final task in the trace.

The third step is to determine for each put task, get task, and conditional assignment task the following:

toUse—The set for loops whose index values the index of the task or the guard of the task is dependent on, or any conditionals in the task scope is dependent on.

toConstruct—the set of for loops that are needed to generate the value of the index or guard for the task, but are not yet constructed. This is a subset of toUse.

toSubstitute—The set of for loops that are already constructed for the end of the trace and whose index values should be used at this point. This is used when some of the scopes for the end of the trace have already been constructed, so as the trace approaches the end they need to be substituted into scope. A similar set is not required for "for loops" that have been created at the start of the trace as their values will already be in scope, and will be replaced by other values as the trace progresses.

This information is stored in ScopeChange objects with one object per task stored in a map. It also determines for the entire trace "finalLoops", a list of "for loops" the final task in the trace has that do not appear in the existing end "for loops", or the "for loops" required for the later "get tasks". Each element in this list only appears once, so it to can be treated as a set until the final step of the algorithm where it is sorted.

This calculation is done with a forward and then a backward pass over the trace. The forward pass populates the per task variables on the assumption that there are no pre-constructed for loops at the end of the trace, and the backward pass modifies this initial result to allow for any pre-constructed for loops at the end of the trace, and to specify any for loops that need to be constructed after the constraint has executed. These passes depend on the property that when moving forward through a trace the only way to move from one set of for loops to another is by placing the value into an array with a "put" and recovering the value from the array with a "get" or a "reduction" in a different set of scopes. Thus when a put is reached all the loops that can change while keeping the array in scope may have changed by the time the value is recovered, so will need to be recreated for the next get. Likewise when traversing the trace in reverse order when a "put" is reached after a get or reduction input all the loops that can change while keeping the array in scope may have changed.

In various embodiments, the "ForwardPass" pass starts with the following:

existingStartLoops—A set containing the for loops that have been constructed for the start of the trace by the code that requires the restriction. These scopes do not need to be created at the start of the trace. This is the key set of existingStartScopes.

existingGetLoops—A set of all the for loops that are already instantiated that a get tasks can use. This is initialized to contain the set existingStartLoops.

availablePutScopes—A set of all the for loops that are already instantiated that put tasks can use. This is initialized to contain the set existingStartLoops.

The "ForwardPass" makes use of a method that takes an intVariable and determines all the "for loops" the intVariable is dependent on without passing through the value or index inputs to a put task. The array argument to a put task may have to be explored to find its constructor. If this is a "get", the search continues through both arguments, if it is either an array constructor task or a sample task, all the "for loops" encompassing that task are added to the result as they may be needed to lookup the corresponding value when constructing the index.

The net effect of this is to compute the subset of the "for loops" that encompass the intVariable that the intVariable depends on, and so may have to be present to calculate the value. Single assignment semantics may ensure that scalar variables are declared in this set or in the global scope. Array values can be declared in other scopes, but as these values can only be reached via a put task unless they are in the set of "for loops", or are in global scope, they also do not expand beyond the set of encompassing loops.

For each put task, get task, and conditional task met in the trace, the following steps may be taken:

As it takes a combination of a put and either a get or reduction input operation to move scope, the following steps for a put operation may only be undertaken if a corresponding task was found in step 1:

(a) Calculate "indexLoops", the set of for loops required for the index and the gaurds of any conditional scopes the task is embedded in.

(b) If values are being passed and the type of the array elements is a scalar calculate, the loops required to calculate the value being set may be determined as "valueLoops" and any loops already in indexLoops may be removed from valueLoops.

(c) Create a ScopeChange object for the task and populate it such that:
toUse=indexLoops∪valueLoops
toConstruct=(indexLoops∪valueLoops)\existingPutLoops toSubstitute=Ø

(d) Add the constructed loops to existingPutLoops as these loops are now available for any following put task:
existingPutLoops=existingPutLoops∪toConstruct (e) Construct the set of loops between the global scope and the scope the array is declared in arrayLoops and set
existingGetLoops=arrayLoops∩(existingGetLoops∪valueLoops) as these are the only loops that exist and cannot have changed.

The following steps may be taken for a get task if the get task is receiving the array from the trace.

(a) Calculate indexLoops, the set of for loops required for the index and the guards of any conditional scopes the task is embedded in.

(b) Create a ScopeChange object for the task and populate it such that:
toUse=indexLoops
toConstruct=indexLoops\existingGetLoops
toSubstitute=Ø

(c) Set:
existingPutLoops=existingPutLoops∪indexLoops
as these are the only start loops still in scope (d) Construct the set of loops between the global scope and the scope the array is declared in arrayLoops and set:
existingPutLoops=arrayLoops∩existingPutLoops (e) Add all the indexLoops to both existingGetLoops and existingPutLoops as both types of task can use these loops, because a trace uses a put task to leave a loop:
existingPutLoops=existingPutLoops∪indexLoops
existingGetLoops=existingGetLoops∪indexLoops The following steps may be taken for a conditional assignment if the assignment is receiving the if or else arguments from the trace.

(a) Calculate the guardLoops, the set of for loops required for the guard and any conditional scopes the task is embedded in.

(b) Create a ScopeChange object for the task and populate it such that:

toUse=guardLoops toConstruct=guardLoops\existingPutLoops toSubstitute=∅

(c) Set:

existingPutLoops=existingPutLoops∪toConstruct-existing

GetLoops=existingGetLoops∪toConstruct

In at least one embodiment, if a conditional assignment is reached the guard or the negation of the guard on the assignment will need to be added to the template. Whether it is the guard or the negation of the guard will depend on whether the trace passes via the if or the else value of the assignment.

In various embodiments, a backward pass may be performed over a trace after a forward pass, as noted above. A backward pass may start with "existingEndLoops". exsitingEndLoops may be the set of "for loops" that are provided for the end of the constraint by external code, and so will not need to be created for the end of the trace here. This may be the key set of existingEndScopes. The backward pass may also start with "constructEndLoops". constructEndLoops may be the set of "for loops" required by the last task in the trace, less any loops in "existingEndLoops". existingEndLoops may be the set of loops that need to be constructed by the constraint to complete the scope of the final task in the trace. This set is constructed by collecting all the scopes of the last task.

When traversing the trace, the backward pass performs the following actions for any put and get tasks that it encounters. The following describes actions taken as a backward pass for a put task. As it take a pair of operation to move scope, the steps for a put operation may be undertaken if a corresponding task was found in step 1 (noted above). The actions may be:

Construct a set containing all the for loops in the scope of the put task, but not in the scope of the put tasks array. This set may be denoted as "outOfScopeLoops". These are the scopes that can change as a result of the put task.

Remove from constructEndLoops any loops that are constructed but are not out of scope as they are constructed here. To do this construct arrayLoops and recover the set toConstruct for this task.

constructEndLoops=constructEndLoops\(arrayLoops∩toConstruct)

Remove the content of outOfScopeLoops from existingEndLoops as these loops are now out of scope.

existingEndLoops=existingEndLoops \outOf ScopeLoops

If the loops in outOfScopeLoops are in constructEndLoops they will need to be added to finalLoops as any creation of them now will be too early in the trace and their state at this point could be different to at the end of the trace. As such they may need to be created at the end of this process.

finalLoops=finalLoops∪(outOf ScopeLoops∩constructEndLoops)

The following describes actions taken as a backward pass for a get task. If the get task receives the array from the rest of the trace or the conditional assignment receives a value from the rest of the trace. The actions may be:

Update the ScopesChange object to use existingEndLoops when possible.

toConstruct=toConstruct\existingEndLoops toSubstitute=toSubstitute∪(toUse∩n existingEndLoops)

Remove any loops constructed by this task from constructEndLoops as they are constructed here, so do not need to be constructed elsewhere.

constructEndLoops=constructEndLoops\toConstruct

Having completed the backwards traversal of the trace the remaining steps are:

constructEndLoops=constructEndLoops\existingStartLoops as these start loops are not overwritten at any point during the trace, and so still are in scope at the end. Then:

finalLoops=finalLoops∪constructEndLoops to complete the list of loops that need to be constructed at the end. Finally finalLoops is sorted to ensure the loops are created in the correct order.

In various embodiments, a fourth step may be performed. Having paired the put and get tasks, and determined the for loops that need to be constructed or substituted into scope at each point in the trace, the restriction for the trace may be finally constructed with a final pass forward through the trace. This fourth step starts with the following data structures:

varSubstitutions—A set of substitutes represented as pairs, the source variable, and the variable to substitute. This set is initially empty. This will be used if passValues is true.

scopeSubstitutions—A map from for loops in the model DAG to the index value that should be used instead. This is initially populated with the values of existingStartScopes.

putIndexes—A map from get tasks to trees describing the values of put task indexes. This is initially empty.

innerScope—The scope new scopes should be written into, initially it is the scope of the provided target distribution description.

The fourth step uses a number of utility methods. One of the utility methods may be "constructEnvironment". constructEnvironment may take scopeSubstitutions, a ScopeChange object describing the changes to make, the current outer scope, and the Restriction Data object that have been populated in the earlier steps. Using these, constructEnviornment applies all the existing substitutions constructs all the for loops in toConstruct in the correct order and sets up all the required substitutions for future code that consumes for loop variables. The loop indexes are named using their name in the model if they have not already been declared. If they have been declared a new name is constructed based on the original name and a pair of unique numeric values. The first identifies the TraceArrayRestrictions object, and the second identifies the loop generated within it. It then updates substitutions to include substitutions to any existing end loops that should start being used by the generated code. It completes by updating the substitutions map replacing any loop substitutions that have now been superseded by the newly created loops, or end loops and removes the substitutions from the compilation context.

Another one of the utility methods may be removeSubstitutions. For every loop in usedScopes, if there is a corresponding substitution in scopeSubstitutions it removes that substitution.

Another one of the utility methods may be constructVarSubstitution. This method takes a variable, a tree providing a value for that variable and a scope. It constructs a variable declaration of the same type but with a new name to the scope and sets it to the value of the tree. It then adds a substitution to the compilation context replacing the provided variable with the newly declared variable. This is part of the tracking variable values through traces and avoiding updating global state. Any unused declarations, or declarations that only include the load of another variable will be optimized away later.

Another one of the utility methods may be constructSubstitutions. This method is to take the scope and variable substitutions plus any existing substitutions from the target and use these to form a new Substitute object that can be passed to the distributed description objects.

Another one of the utility methods may be constructAdditionalScopes. Like constructEnvironment, constructAdditionalScopes constructs for loops and updates the substitutions map, but this only does it for the loops in the finalLoops set.

Moving forward through the trace, the following operations may be performed for put, get, and conditional assignment tasks that are encountered. For a put task that is encountered, if the put task has a corresponding task, the following actions may be performed:

- Call constructEnvironment to construct the required for loops, substitutions, etc, and set the resultant scope as the new inner scope.
- Construct a substitution object for the current state of the restriction and pass it and the target so that a new target can be created mapping this task to the current substitution state. This is done to allow variables within the trace to be constructed later with the correct substitutions.
- Test if passValues is set:
  - Sort any elements in requiredVariables for this task. For each of these construct the tree to represent the value, and call constructSubstitution for each value to declare a variable holding the value, and to construct a substitution. These values are the values required to construct the value that is being set.
  - If the value being set is a scalar construct the tree to represent the value being set by the put task, and using the method constructSubstitution create a declaration of the value, and a substitution to replace the output variable from the corresponding task.
- Call getForwardIR on the put index value to construct a tree representing the index of the put operation and using the corresponding task as a key add it into the putIndexes map.
- Call removeSubstitutions to reset the state of substitutions in the compilation con-text.

If there is not a corresponding task the substitutions at this point should still be saved. There is a caveat to this which will be discussed when describing the handling of back-traces below.

For a get task that is encountered, if the get task gets the array from the trace, the following actions may be performed:

- Call constructEnvironment to construct the required for loops, substitutions, etc, and set the resultant scope as the new inner scope.
- Call getForwardIR on the get index value to get a tree representing it.
- If there is an entry for this task in putIndexes construct an if scope in the scope constructed by constructEnvironment, using equality of the put and get index trees as the guard, and set this scope to be the new inner scope.
- Call removeSubstitutions to reset the state of substitutions in the compilation con-text.

If there is an entry in putIndexes and pass values is set, perform the following actions for a reduction input:

- Get the substitute value for this tasks output from the compilation context and remove the substitution.
- Using the methods in the Reduction Scope reduce all the elements in the array apart from the one set by the put operation. The stored index is used for the mask argument to achieve this.
- Substitute the recovered put value for one of the reduction inputs and the calculated result for the other, and generate the tree for the reduction body again to complete the calculation.
- Using the method constructSubstitution create a declaration of the value, and a substitution to replace the reduction output variable.

If a conditional assignment task is encountered and the task gets one of the values to assign from the trace the following actions may be performed:

- Call constructEnvironment to construct the required for loops, substitutions etc, and set the resultant scope as the new inner scope.
- Call getForwardIR on the assignment guard to get a tree representing it.
- Construct an if scope in the scope constructed by constructEnvironment using the constructed tree, or the negation of the constructed tree depending on whether the trace goes via the if or the else input respectively, and set this to be the new inner scope.
- Construct a substitution for the output variable using an IRTree constructed from the input to the task described in the trace.
- Call removeSubstitutions to reset the state of substitutions in the compilation context.

Having constructed all the guards for the put and get indexes, and conditional assignment guards, and all the required substitutions, a fifth step may perform:

- Construct the for loops listed in finalLoops.
- Construct any values in requiredVariables for the final task.
- Remove any remaining substitutions from the compilation context.
- Construct and return a new ScopeDescription holding all the constructed substitutions and the new inner scope.

When "for loops" are constructed, the duplicate flag on the ScopeUtils method to construct the scope is set by testing if the "for loop" is in the existing scopes set in the scopeDescription object, and the existing scopes set is extended by adding each "for loop".

Having described how restrictions based on a trace through the DAG are implemented, the following discussion will describe how these techniques can be used to automatically construct environments for pieces of code to execute in. These techniques may be implemented through a class of object called a "ScopeConstructor". These are used to construct a tree of scope constructors where each scope constructor can be extended with additional traces to make another scope constructor. Any scope constructor can be used to place IR trees into the scopes represented by the ends of the traces it was constructed with, or into the scopes any preceding scope constructors where constructed with.

The first instance of this ScopeConstructer object is constructed with:

- A dataflow task whose scope this scope constructor should represent.
- A scope that any constructed scopes should be placed in. This is not constrained to being a scope from the DAG, but is required to include the scope of the provided dataflow task or a substituted alternative.

A comment that should be included in with the scopes generated by this object.

The compilation context for this compilation process.

Factory methods are provided to extract some of this information from dataflow tasks where applicable, and to provide unit value for values that have no other value provided. These allow the scope constructor to be used in situations that do not require all of its possible functionality.

Once constructed, a ScopeConstructor can have trees added to the scopes it has constructed via a method that takes a lambda (an anonymous function) in the form of a TreeBuilder. A tree builder takes a TreeBuilderInfo object as its only argument and constructs a tree which it places into the compilation context. This method takes advantage of the compilation contexts ability to push scope tracking objects allowing the user code to construct a tree as normal. Any scopes that have already been constructed will be substituted for the global scope, and similarly with for loop indexes. Once the user code has completed the tree can be recovered and added to the constructed scope. As we will cover later in this section this method may be called multiple times to construct multiple instances of the tree, and as such it must be side effect free.

Having constructed a scope constructor additional scope constructors can be created by calls to methods to:

- Add an isolation scope—This method applies a block around any IR trees that are added so that any declared variables will not interfere with variables declared in other IR trees.
- Add a conditional—This method takes a Boolean expression and return a pair of scope constructors, one representing if the condition is true, the other representing if the condition is false.
- Add constraints—This method takes a trace, or a set of traces that start at the task currently held by the scope constructor and run to a common end point. It will then construct a new scope constructor that will only execute trees if at least one of these traces are valid. In the event of multiple traces being valid, the trees will still only execute once.

Figure 3:
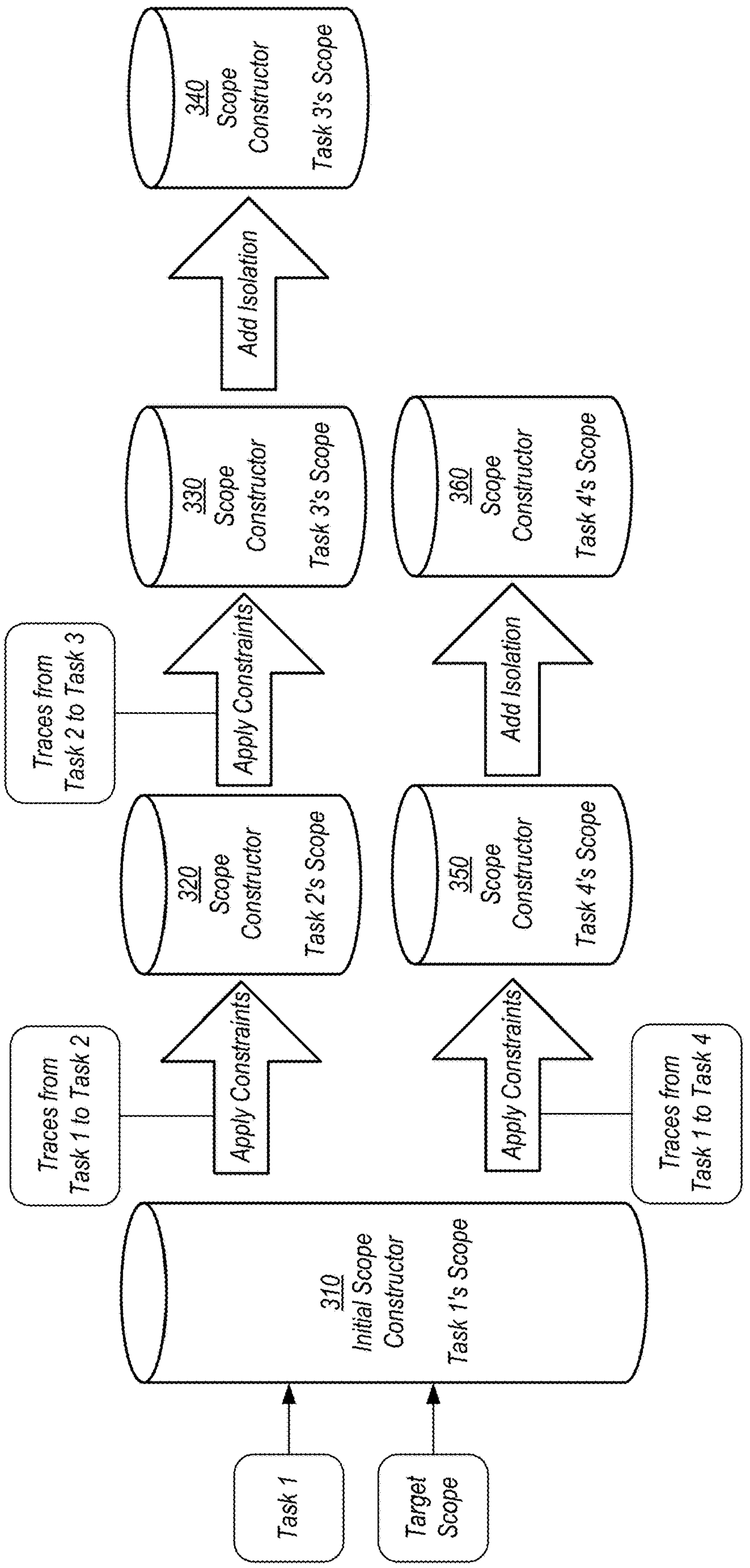
FIG. 3 is a block diagram illustrating an example tree of scope constructors, according to some embodiments.

FIG. 3 illustrates a tree of scope constructors starting with the initial constructor 310 for task 1, then a new scope constructor 320 is produced that will execute code in the scope of task 2 if there is a valid path from the provided scope configuration of task 1. This process is repeated for traces from task 2 to task 3 using scope constructor 330, so the code inserted into this scope constructor will only execute if there is a valid path from task 1's provided scope to task 3 via task 2. Multiple scope constructors can be created from each scope constructor, as demonstrated by the creation of the scope constructors with traces from task 1 to task 4 (e.g., 310, 320, 330, 340, 350, and 360).

In various embodiments, the scope constructors are immutable objects that are built up over the course of the construction of a function, or function part that describe how to configure the environment when adding new IR trees to the scope tracker in the compilation context. This way the programmer has less information to track. An example of this can be seen in FIG. 3.

Within the ScopeConstructor a number of pieces of meta data are kept including a counter that is used to ensure that all generated names are unique, but the key abstraction is a list of ScopeDescription objects. Each of these describes a possible configuration with any constraints, isolation scopes, comments, etc. applied. When applying constraints, if more than one possible trace a constraint is constructed for each trace and a Scope Description will be made for each constraint. As such while the initial Scope Constructor will have a single Scope Description, the number of descriptions can increase over time. An example of this can be seen in FIG. 4. As constraints between traces are they will be nested inside each other to ensure that only state spaces that are valid for a given list of traces are able to progress. These restrictions are implemented using the constraint algorithm described above. To simplify the programming model scope constructors enforce that if there are multiple traces between the producer and consumer tasks, Boolean flags are used for each possible configuration of the scopes surrounding the consumer that can be reached from the producer. These are tested before any user provided code for a pairing is executed, and the code only executes if the flag is not set. The flag is set the first time the code is executed.

Each scope descriptor contains:

- The scope that the user provided IR trees should be written into.
- A list of "ConstraintData" objects. When a new scope description is made from an existing scope description by the addition of a constraint a the list will contain the existing constraintData objects plus one more describing a new constraint description holding information relating to the latest constraint. The constraintData objects contain:
  - The consumer task that was reached by the constraint.
  - A map from the consumer task and each put task in the trace to the variable substitutions that should be applied when adding trees to this point in the scope construction. This is important because having determined that the trace is valid, values at different points along the trace may need to be constructed, and so the state of the scopes at these points needs to be reconstructed as described below.
- A set containing all the scopes that have already been constructed. This is only used as an input to the constraint construction methods in order to retain index names from the DAG as much as possible to improve code readability.

When the first scope constructor is created its one scope description will contain the target scope as its scope and no substitutions.

Figure 4:
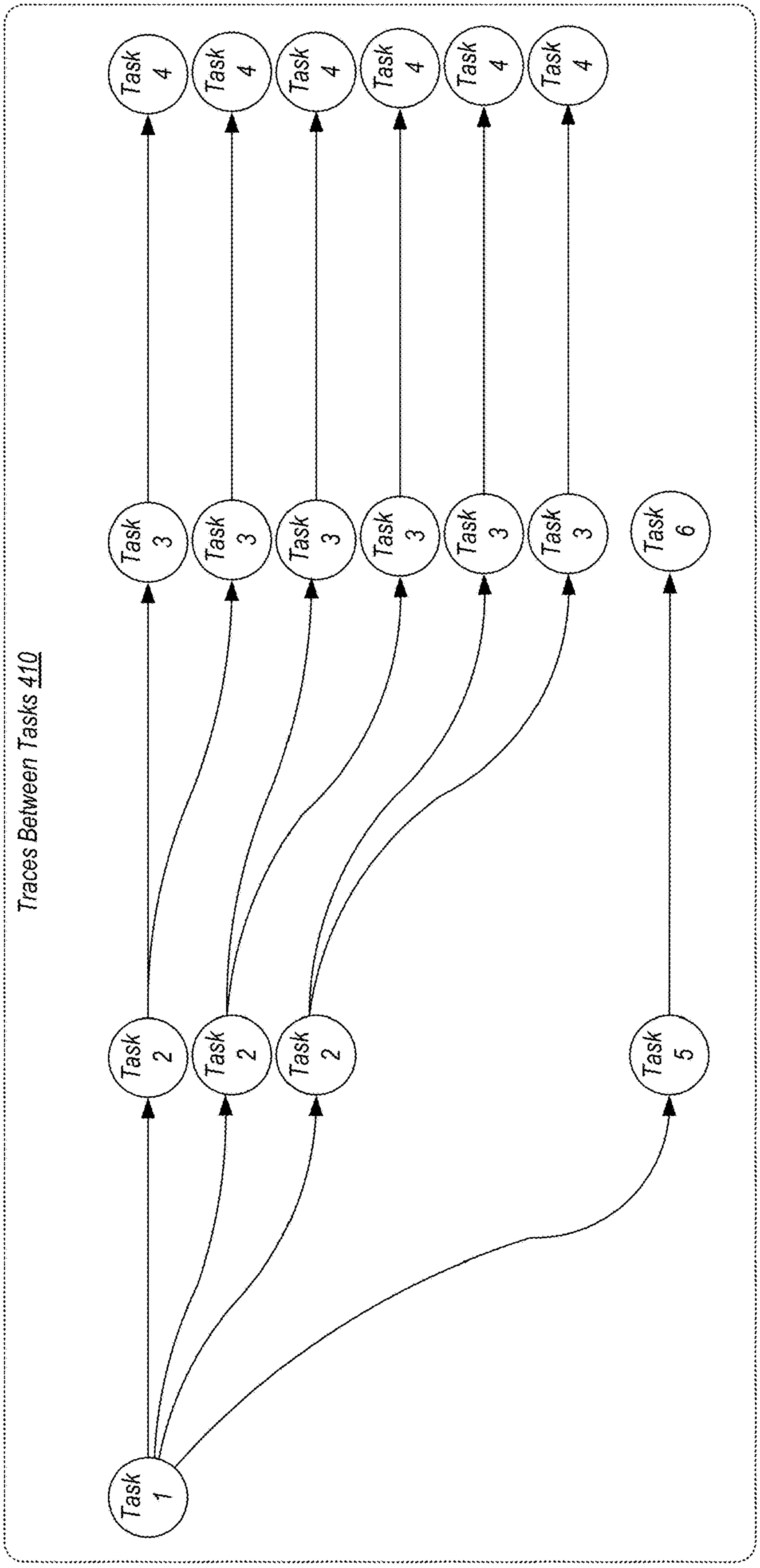
FIG. 4 is a block diagram illustrating an example of scope description objects, according to some embodiments.

FIG. 4 illustrates a representation of the scope description objects that are created for the set of scope constructors that are created in FIG. 3. In this example of traces between tasks 401, there are 3 traces between tasks 1 and 2, 2 traces between tasks 2 and 3, and 1 trace between tasks 1 and 4. Each circle represents an instance of a scope description and the number inside it represents the scope constructor it is associated with.

As already described, to add a tree the user provides a lambda that takes a "TreeBuilderInfo" object and constructs the required tree, placing it into the correct scope drawn from the model in the scope tracking object in the compilation context. Having provided this lambda the following steps are performed for each scope description.

- Push a new scope tracking object onto the stack of scope tracking objects in the compilation context. This will allow the tree constructed in the lambda to be constructed in isolation.
- Apply the variable substitutions that are associated with the scope configuration of the consumer task. This mapping will have been constructed when the constraints were constructed, or will be an empty map if no constraints have been constructed.
- Substitute all the scopes of the consumer task with the global scope so that when the lambda tries to place trees into any of these scopes they are actually placed in the global scope and none of the scopes are constructed.

Add the required user trees to the compilation context by executing the lambda.

Remove the substitutions.

Recover the described tree from the scope tracking object.

Pop the scope tracking object off the top of the stack so restoring the original scope tracking.

Add the recovered tree to the scope in the Scope Description object. As this is run for every scope description object apart from adding trees to the scope tracking object the lambda's must be side effect free.

When a constraint is added, the following actions are performed:

Simplify the traces so that they only contain the start and end of the trace plus any tasks that access arrays, or are conditionals.

If there is more than one simplified trace calculate the dimensions of the required guard and declare a guard for each possible instance of the consumer task in each scopeDescription of the current scopeConstructor.

For each scopeDescription, simplified trace pairing create a new scopeDescription by:

Constructing a constraint starting at the scope and substitutions in the scope description to determine if the trace is valid.

If a guard is being used add a conditional scope to test if the consumer has been visited yet in this configuration, and place code inside the conditional to set the guard if it is reached. This is now the new scope.

Construct a scope description using the scope and substitutions constructed.

Create a new scope constructor for the scope descriptions created in the above steps.

The constraints are constructed using the algorithm discussed above. The guards are constructed as follows. To assist in keeping track of the guard information a "GuardDesc" object is constructed to hold the name of the guard, and the for loops it is required to cover. There is lots of potential for optimizations in this second item as some of these for loops may be constrained to constant values, or always be explored fully by any constraint that reaches them.

The first check when constructing a guard description is if there is more than one constraint trace, if not then null is returned to signify that no guard is required. Having determined that a guard is required a name for the guard is constructed based on the producer and consumer tasks, plus if a name already exists for this pairing a unique numeric id. The final step is to calculate which scopes the guard needs to cover. The simplest approach would be to cover all the for loops that the consumer task is nested in. This is improved on slightly by gathering all the scopes of the arrays that are used by get tasks with corresponding put operations, and removing from the set of for loops any for loops that appear outside the outer most of the array scopes. This removes any for loops that could not have changed between the producer and consumer tasks as there was no array to take the data from one iteration to the next.

Having constructed the guard description the guard is allocated and initialized in the scope of each distribution description. In the case of guards without any for loops this is just the declaration of a single Boolean variable with the value false. For guards with one or more for loops, a global array is declared using the maximum possible number of iterations of each of the for loops for the dimensions. This value is calculated by iterating through the for loops, and relies on the optimization phase to remove unrequired steps. A local reference to a global array is then declared and initialized. This step is done as the dimensionality of the array may have been increased to allow a copy of the array per thread in parallel code and during the initialization this will be dereference to give the expected array. Finally for each trace a constraint is constructed and for all indexes that this reaches the value in the array at that point is set to false. This decision was made over setting all the values in the array to false as it is expected that in most cases only a very small number values will be set and the constraints can be optimized away. In addition by restricting the initialization to this smaller set of locations hopefully future optimizations can also shrink the size of the allocated array.

Figure 5:
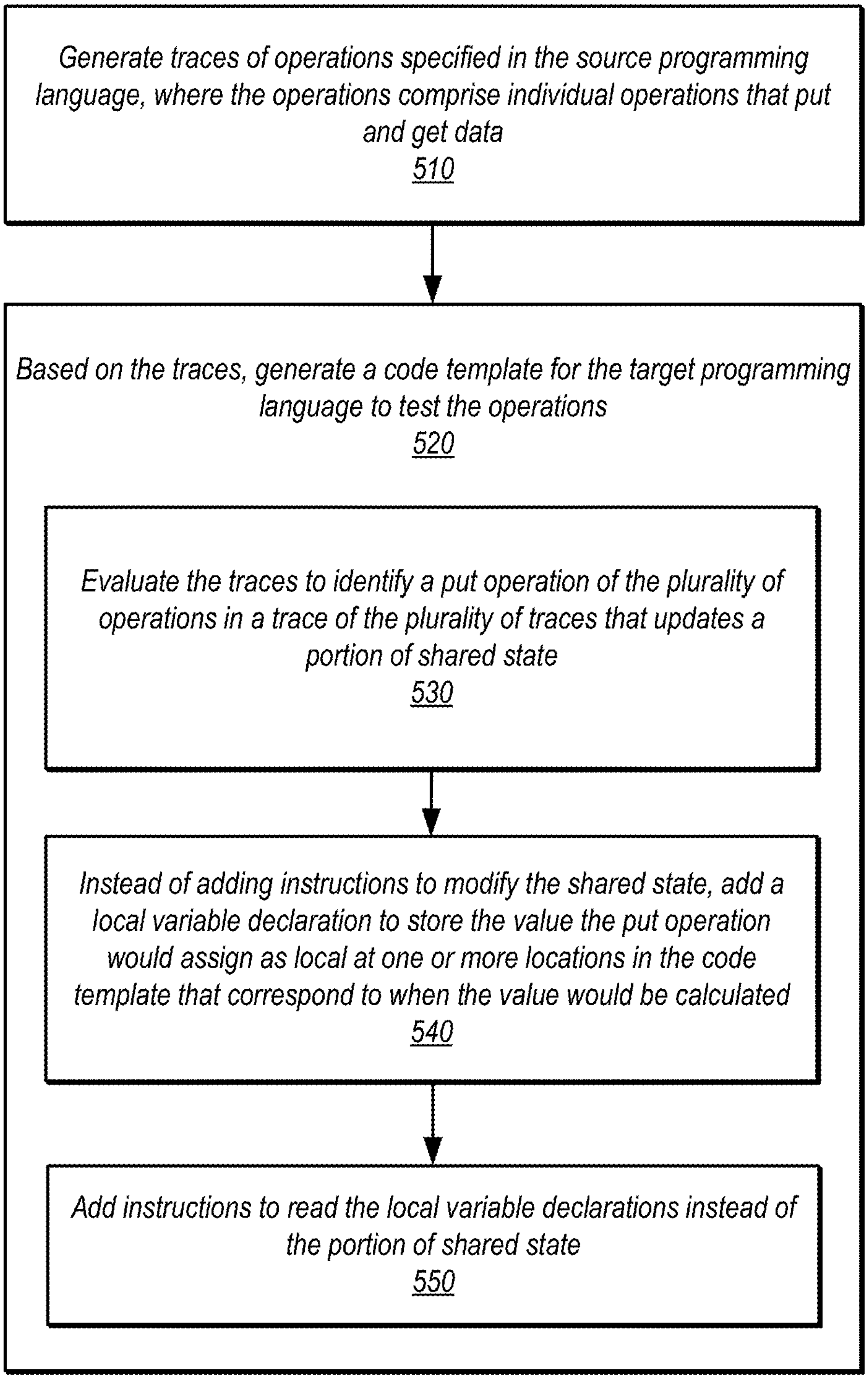
FIG. 5 is a high-level flowchart illustrating various methods and techniques to generate code templates in a target programming language for traces of operations to identify and replace instructions to modify shared state with local variable declarations, according to some embodiments.

One example of substitution techniques is provided below. FIG. 5 is a high-level flowchart illustrating various methods and techniques to generate code templates in a target programming language for traces of operations to identify and replace instructions to modify shared state with local variable declarations, according to some embodiments. As indicated at 510, traces of operations specified in the source programming language may be generated, where the operations comprise individual operations that put and get data.

As indicated at 520, based on the traces, a code template may be generated for the target programming language to test the operations, in some embodiments.

As indicated at 530, the code template may evaluate the plurality of traces to identify a put operation of the plurality of operations in a trace of the plurality of traces that updates a portion of shared state, in some embodiments.

As indicated at 540, instead of adding instructions to modify the shared state, a local variable declaration may be added to store the value the put operation would assign as local at one or more locations in the code template that correspond to when the value would be calculated. As indicated at 550, instructions may be added to read the local variable declarations instead of the portion of shared state, in some embodiments.

All random variables can be sampled via the method call "sample" to produce a single sample value. Random variables with a finite set of sample values can also be sampled via a call to "distributionSample" which provides a distribution over the possible values from the random variable during inference calls.

When performing conventional execution, these calls behave like conventional "sample" calls. As, there is a large performance cost if the values of the distributions are not of interest, and if they are of interest they can be reconstructed by fixing the surrounding sample values, taking a sufficient number of samples and averaging the results. When performing inference of values or probabilities the possible values sampled from distributions along with the corresponding probability of each value must be considered.

The generated model contains for each instance of each distribution sample task an array that contains the probability of generating each output, and the corresponding random variable class has a method that takes an "IRTree" representing the index of a probability in this array and returning an IRTree representing the corresponding value, for example turning an index into a Boolean value for a Bernoulli random variable. These allow the probability of different values to be explored.

When the Traces object is constructed for each random variable argument the set of traces from sample tasks, constants, and inputs to the argument is constructed. To reduce the number of traces under consideration traces from inputs and constants are only included if the value is placed in an array and the trace would generate a constraint using the algorithm described above.

When considering the set of possible values for each argument and their associated probability distributions in the set of traces leading to the argument must be considered. Because traces can go via arrays it is not sufficient to consider the cross product of the output of all of the distribution sample tasks as the presence of arrays mean that not all the traces have to be valid at the same time and often not all the trace can be valid at the same time. Which ones are valid may depend on the index values of any for loops the consuming random variable is located within and potentially the values of other samples. Also when multiple traces start with the same distribution sample task that task may be from a single iteration and so producing a single value, or each trace may reference the task on a different iteration. This means that for each valid trace which iteration the producing task executed on must also be calculated.

Figure 6:
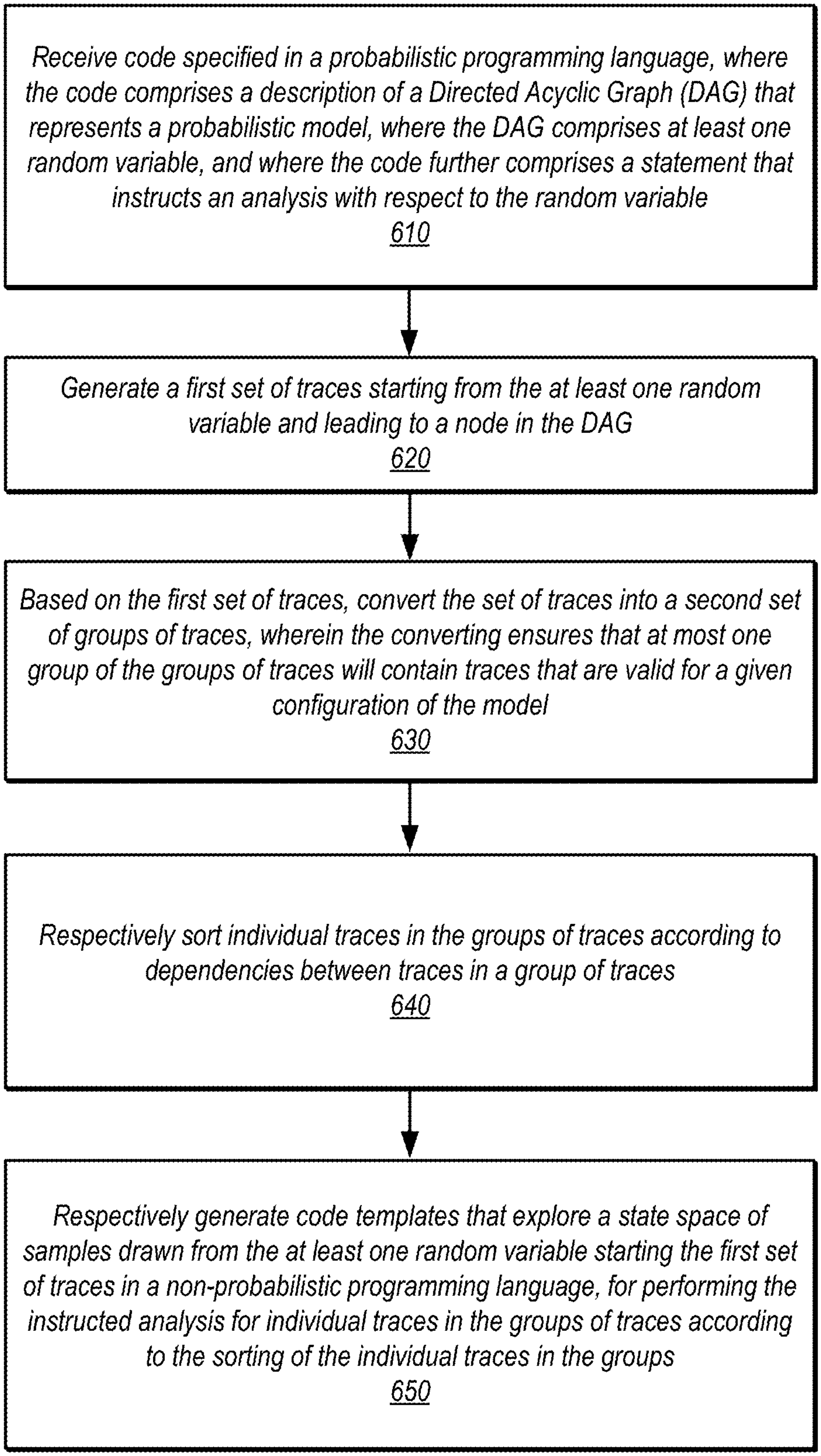
FIG. 6 is a high-level flowchart illustrating various methods and techniques is a flow diagram illustrating methods and techniques to generate code templates that explore a state space of samples drawn from a random variable of a probabilistic model, according to some embodiments.

FIG. 6 is a high-level flowchart illustrating various methods and techniques to generate code templates that explore a state space of possible sample values drawn from a random variable of a probabilistic model, according to some embodiments. As indicated at 610, code specified in a probabilistic programming language, where the code comprises a description of a Directed Acyclic Graph (DAG) that represents a probabilistic model may be received, in some embodiments. The DAG may comprise at least one random variable. The code may further comprise a statement that instructs an analysis with respect to the random variable.

As indicated at 620, a first set of traces starting from the at least one random variable and leading to a node in the DAG may be generated, in some embodiments. As indicated at 630, based on the first set of traces, the set of traces may be converted into a second set of groups of traces, wherein the converting ensures that at most one group of the groups of traces will contain all of those traces that are valid for a given configuration of the model, in some embodiments. As indicated at 640, individual traces in the groups of traces may be respectively sorted according to dependencies between traces in a group of traces, in some embodiments. As indicated at 650, code templates may be respectively generated that explore a state space of possible sample values drawn from the at least one random variable starting the first set of traces in a non-probabilistic programming language, for performing the instructed analysis for individual traces in the groups of traces according to the sorting of the individual traces in the groups, in some embodiments.

In various embodiments, the set of traces for each argument is first transformed into a set of sets of traces. Each of these sets contains all the traces required to provide the argument to the random variable if all the traces are valid. For any given configuration of the for loops in the model exactly one set will have all its traces valid. Some sets may have no configurations for which all the traces are valid, code generated for these sets can often be optimized away later in the compilation process.

The algorithm to construct these sets makes use of a function to test if two traces are dependent on each other, such that if the value at the source of one trace changes, the value output by the other trace will also change. Traces for which this is not true cannot both be satisfied at the same time and so should be placed in different sets. This is based on the observation that the only way to get independent traces is by putting the values into different cells in an array as at most one of the values can be recovered by a given get. It works as follows:

First, allocate a stack of "dataflowTasks".

Second, starting at the end of the traces compare each item in turn until the first element that is not equal is found. This is the point that the two traces diverge. For each task that interacts with an array perform the following action based on the task type:

- get—If the trace provides the array add the get task to the stack.
- reduction input—Add the task to the stack.
- put—If the stack is not empty pop a task off the stack.

Third, return true if any of the following conditions are true:

- The task at the point of divergence is the same in both traces. If it is both traces feed into a shared task and are dependent. The only type of task this can be false for are put tasks as these can be drawn from different parts of the DAG.
- The stack is empty. If this is the case the result of the remaining part of the traces is an array that is consumed as a whole array so the result is dependent all puts to the array.
- The top element in the stack is not a get task. This means that again the array is being consumed in its entirety, probably by a reduction and so is dependent on all puts.

If none of these are true the traces are independent as we have two different put tasks and the get on the top of the stack can recover the value placed by at most one of them so return false.

Using this test it is possible to construct from $T_i$, the set of traces to argument i, the set of sets of traces $R_i$ where all traces in $T_i$ appear in at least 1 set, all the traces in each set are dependent on each other, and no trace that would be dependent on all the other traces in a set in $R_i$ is not in that set. $R_i$ is constructed as follows:

```
Construct a set R_i to contain all the sets of traces to return.
Initialize this set by placing an empty set into it.
For each trace t in T_i:
  For each set S in R_i:
    If all traces in S are dependent on t
      Add t to S.
    Else
      Construct a new set containing t and all the traces
        in S that are dependent on t.
      Add this new set to R_i.
```

When constructing these sets, $T_i$ should include all the traces from other locations (e.g., that lead from samples, constants and model inputs to the consumer task, not just the traces from distributions samples). To see why this is the case consider the set of traces {A, B, C} where A is dependent on B and C, but B and C are independent. This would give the set of sets {{A, B}, {A, C}}. If C came from a regular sample and was not included the set would be {{A, B}}, this would mean the value from A was not evaluated if the trace from B was not valid, even if the trace from C was valid. Similarly if we constructed the set {{A, B}, {A}} if C was not valid, but A and B were the value from A would be evaluated twice, once without a defined value from B. By extension it is also necessary to include traces where a constant or an input is the source. These sets can be reduced by filtering out traces from constants and inputs that do not add and read the constant from an array. This filtering is applied when traces are originally gathered. Without this filtering traces to constants used as the step on for loops etc will be included and this creates a significant performance effect. As a further optimization, if none of the traces in a $T_i$ start at a distributed sample the set $R_i$ can be replaced with the set {{ }}.

Having constructed $R_i$ for each argument, these sets can then be merged into a set of sets of traces for the task as a whole by taking the cross product of these sets and then unifying the innermost sets. For example if we have the sets {{A, B}, {B, C}} and {{D}, {E, F}} this process will give the set {{A, B, D}, {A, B, E, F}, {B, C, D}, {B, C, E, F}}. It is probably possible to be more rigorous about ensuring that less unsatisfiable sets are constructed during this process, but it is expected that the unsatisfiable sets will be removed during the optimization phase so more time has not been spent on this.

To explore the space of possible values from distribution samples and their corresponding probabilities requires for loops to iterate through these possibilities and checks to confirm if the trace from the source distribution sample to the consumer is valid in the current state. The construction of the different scopes and guards for each of the possible sets of traces to a task is achieved by extending the scope constructor class to add scope description objects for each possible set of traces. These extensions are accessed via the following new methods.

Some of the new methods for accessing these extensions are constructors methods that take an additional argument containing the set of sets of traces constructed (as discussed above) for the task the scope constructor is being created for. Again default values are inserted in the case that this argument is not provided.

Further ones of the new methods for accessing these extensions are the additional "addConstriant" methods are added that take an additional argument containing the set of sets of traces constructed (as discussed above) for the task at the end of the traces that the constraints are being built from. Again default values are inserted in the case that this argument is not provided.

Further ones of the new methods for accessing these extensions are additional "applyDistributions" methods to construct the template code for any traces from distribution samples that are not used as the inputs to the constraint trace guards. This is done to allow the delaying of the construction of distributions that the constraints do not depend on till later in the process. This can make the programming model easier as single assignment means only get indexes can be distributions, so for each distribution used as an index only one value will satisfy the constraints, so a chain of constraint traces can be constructed before the distributed values are considered in the knowledge that the code inserted at the end of the chain will only be executed once. For example, a chain might be constructed from a producing sample task to a consuming random variable, to a sample task from that random variable and on to the value of that sample. Constructing this chain and reaching the end of it once before considering all the possible values of the distributed variables makes the model far easier to understand.

For each trace, there are 3 possible options for the state of the sample task:

- The sample value can be fixed by the user setting it, in this case the value is just read from the model and the probability is 1. Traces from non-distributed sample tasks also fall into this category, but will not need a guard to check the fixed flag.
- The value of the sample task has already been constructed for an earlier trace. In this case the loop indexes of the start of this trace will match the indexes for the already constructed value. The value can be set to be equal to the original value and the probability does not change.
- The sample value is not fixed and has not already been constructed so a loop is required to consider each possible value and its corresponding probability. In this case the loop indexes must not match any of the previous instances of this sample task.

Figure 7:
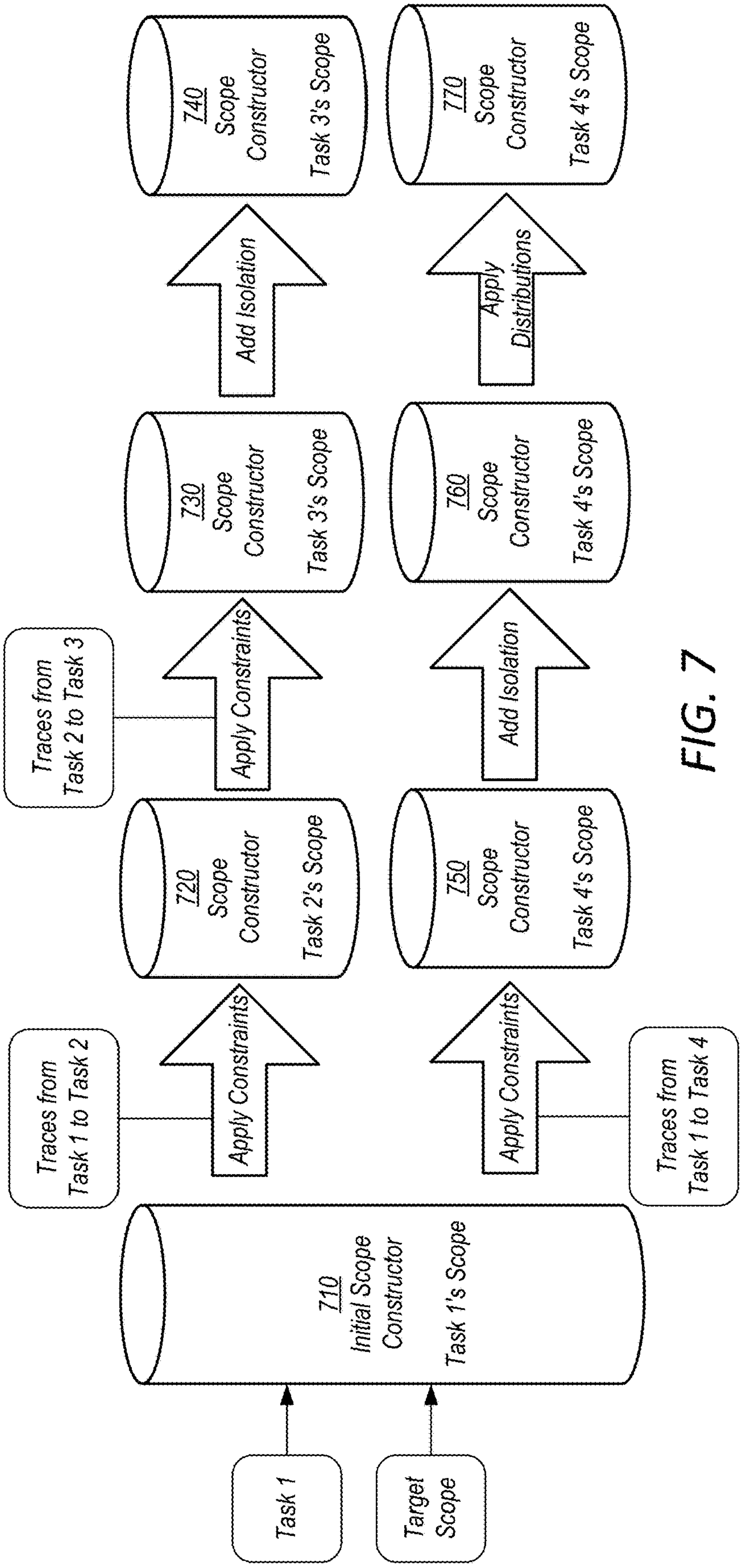
FIG. 7 is a block diagram illustrating an example tree of scope constructors that adds traces to distributed arguments, according to some embodiments.
Figure 8:
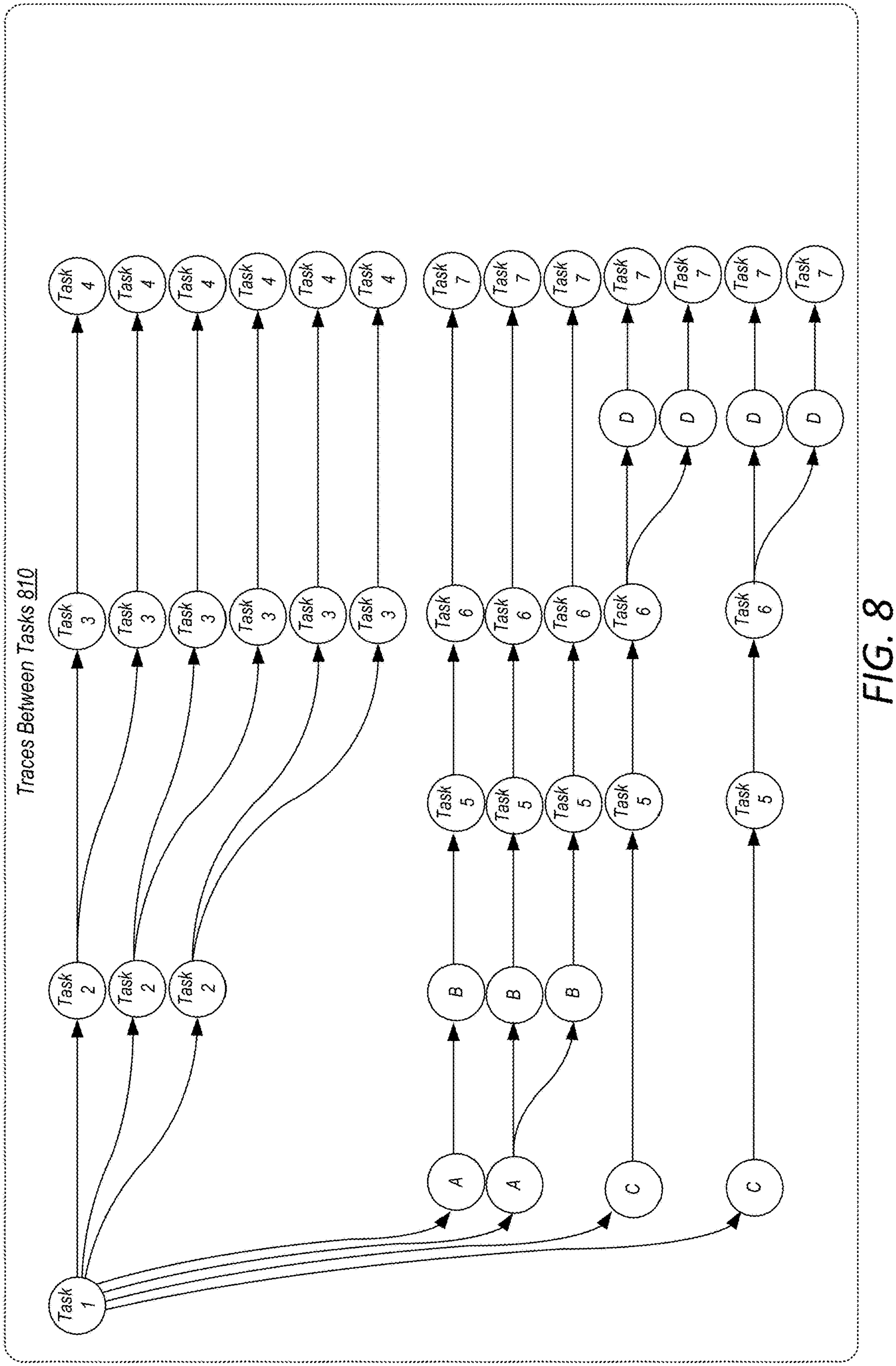
FIG. 8 is a block diagram illustrating an example of scope description objects extended with additional descriptions from traces to distributed arguments, according to some embodiments.

An example of how the set of scope constructors that appear in FIG. 3 can be extend to use some of these methods can be seen in FIG. 7, and the corresponding change to the graph of scope descriptions in FIG. 4 can be seen in FIG. 8.

To add distributions to the scope constructors, the following augmentations are made to the data structures:

- ConstraintData objects are augmented with a set of sets of traces. These are the traces that still need to be applied from the set of sets of traces that was passed when this constraint data object was created.
- ScopeDescription objects are augmented with:
  - A map from distribution sample tasks to a set of objects containing the scope indexes and sample value of every instance of that sample task that has already been constructed before the scope in this ScopeDescription is reached. When first ScopeConstructor is created this is empty.
  - An IRTree providing the probability of reaching the scope described in this scope description. As the values from the distributed sample tasks may change, so will the value output by this tree. Typically this is created by declaring a variable in the loop that iterates through the values for the sample task and setting it to the current probability times the probability of this value. The IRTree is then just a load of this value. When the first ScopeConstructor is created this has the value 1. A method call in the ScopeConstructor is provided to allow these values to be reset to 1 in the case that that aspect of the probability has already been considered.
  - A map recording which sample tasks are known to be fixed at this point. This prevents the generation of code that could never be executed due to earlier guards on the same model flags.
- TreeBuilderInfo is also augmented with the probability from the ScopeDescription object.

FIG. 7 illustrates extending the scope constructors created in FIG. 3 in one embodiment. Starting with the initial constructor 710 for task 1, then a new scope constructor 720 is produced that will execute code in the scope of task 2 if there is a valid path from the provided scope configuration of task 1. This process is repeated for traces from task 2 to task 3 using scope constructor 730, so the code inserted into this scope constructor will only execute if there is a valid path from task 1's provided scope to task 3 via task 2. Multiple scope constructors can be created from each scope constructor, as demonstrated by the creation of the scope constructors with traces from task 1 to task 4 (e.g., 710, 720, 730, 740, 750, and 760). Additionally, traces to distributed arguments may be added when creating scope constructor 760 and applying these to create scope constructor 770.

FIG. 8 illustrate extending the scope descriptions seen in FIG. 4 to include the additional descriptions resulting from the additions in FIG. 7. This arrangement is correct if: The trace leading from task 1 to task 4 depends on either A and B, or on C, but not on D; Traces A and B start at the same sample task, but traces C and D start at different sample tasks. The scope descriptions for A, C and D represent the scenario that the source sample task is fixed or not fixed. For B as it shares the same source as A, if A is fixed there is only one option it too must be fixed, if it is not fixed there are 2 options, either it is the value already constructed, or it is a sample from a different iteration, thus there are 2 scope description objects.

The first step of applying the traces is for each constraint trace to split out the distributed samples and that must be evaluated before the trace can be considered and the traces that should be delayed till after the constraint trace is considered. The aim here is to take a set of constraint traces which end at a task t, and a set of sets of distribution traces that end at the same task t, and split them into a structure of type Map<Constraint trace, Map<Set<Pre constraint trace>, Set<Set<Post constraint trace. The outer map can be constructed by running the same code for each constraint trace to generate the inner map. The inner map is constructed by looking at one set of distribution traces at a time. The traces in this set can be sorted into pre or post traces by looking at the following conditions:

Does this trace end with the same argument to the final task in the trace. If it does not the trace is a post trace.

If the constraint trace and the distribution trace are equal discard the trace as this distribution is being computed at the moment.

Gather from the constraint trace all the get tasks that can be used to construct guards in a constraint. These are the gets where the trace provides the array and there is a corresponding put task in the trace. If any of these get tasks appear in the distribution trace and the distribution trace provides the index value to the get task then the distribution traces output is require to evaluate the constraint trace so it is a pre trace. Otherwise it is a post trace.

There is an additional optimization that can be performed here. If the constraint trace ends with a task producing a distribution variable, any set of distribution traces that does not include the constraint trace can be discarded as it cannot be satisfied due to there being a mutually exclusive alternative trace as described above.

The steps to apply distributions are applied to each scope description in turn as different scope descriptions may have a different set of already constructed distributions and a different set of distributions to apply.

When adding a distribution that reaches the consumer via a trace it is important that all distribution samples that the trace depends on are added before adding the trace. To help with this the comparison method for traces is defined so that traces that travel via the index of a get task appear before traces that travel via the array argument of a get task. As put indexes are not allowed to be from samples because of the single assignment semantics, no special treatment is required for put tasks.

First, how distributions are added will be discussed when the scope description has already been constructed, e.g., when a call to applyDistributions is called. Then, the additional functionality required when constructing distributions whose values are required for user added constraints may be discussed.

Each scope description has a list of constraintData objects, and each of these has a set of sets of traces representing the traces from distributions that are yet to be evaluated. If there are no distributions associated with a given link constraintData object, the set will contain the empty set. Traces in constraintData objects can be applied one constraintData object at a time, with the application of each constraintData object creating a new set of scope descriptions to be used when applying traces in other constraintData objects. Accordingly, the traces can be applied from a single constraintData object.

Applying the distributions represented by these sets of traces will produce a new set of scope descriptions, so if there are n sets of traces, there will be n sets of scope descriptions of which the union makes up the scope descriptions to use for the next scope constructor. When the new scopeDescription classes are constructed by applying the distribution traces in the constraintData set the new scopeDescriptions will have a new constraintData object to replace the current one. The new objects distribution trace set will only contain the empty set in the set as there are no more traces to apply. Because the calculation of each set is independent other than the id used for unique variable names, we can again will look at just a single set of traces here.

Within a set the process can be further broken down to take a single trace from the set of traces and a single scope description from the set of scope descriptions this sample should be added to. Initially the set of scope descriptions will contain just the scope description that the constraintData object was drawn from, but as this process will return a set of scopeDescriptions that will all need to have the next trace applied to this set will grow as traces are iteratively applied in order. If there are no traces to apply a block scope is created inside the existing scope of the scope description to ensure no 2 scope description objects in the returned set have the same scope. Without this variable declarations could cause collisions. Any unrequired block scopes will be removed later in the optimization phase.

In each iteration a scope description based on the current scope description is created for each possible scenario for the distributed sample. As described above, there are 3 possible scenarios for distribution samples: It could be fixed by the user; It could be a sample whose value was calculated earlier in the structure that represents a distributed description; Or, this could be the first time this particular instantiation of the distributed sample appears. There are also the traces that do not start with a distributed sample task. This case will be considered first.

If the trace does not start with a distributed sample task there is no sample to consider and all that is required is for the constraint based on this trace to be placed in the scope represented by the ScopeDescriptor and a new ScopeDescriptor constructed to represent the scope with this additional constraint. There are no scopes already constructed for the start of the constraint, but the end of the constraint will be the constraints already constructed for the task in the ConstraintData object. The map to represent this contains each of the scopes for this task as its keys and the substitution for the loop index for the value. This is the end scope map which will be used for constraints in all of these cases.

If the trace does start with a distribution sample then the 3 possible cases must be explored. To construct the ScopeDescriptions for the case of the already generated samples the details of each existing distribution sample are stored in SampleDesc objects. These are held in sets in a map indexed with the corresponding distributed sample task which is stored in the scope description. For each of these existing samples a new scope description based on the current scope description is constructed with the output of the distribution sample substituted for the value stored in the SampleDesc. The trace constraint is then created with the starting scope map read from the SampleDesc which contains the indexes used for each scope when the distribution values were iterated. This will result in the index values that are used for those scopes being drawn from the ones that were created earlier. The end scope map is constructed as described earlier. This will generate one new ScopeDescription for every SampleDesc in the original ScopeDescription.

For the cases where the sample is not a distribution that has already been explored, the first step is to check the cached flags in the scope description to determine if the sample is known to be fixed or not fixed if this point is reached. The caching of these values is purely a performance issue to prevent code being generated that cannot be executed. The optimization phase would remove unreachable code later but it would make the whole compilation process slower. If the value of the flag is known only one of the following options would be executed, but for this explanation we will assume the flag is not set so the whole process is explored.

The first step is the construction of an if else scope inside the scope in the target ScopeDescription. The guard is the value of the fixed flag for the sample task.

For the case that the flag is true a scope description is created from the target scope description to wrap the if scope. The value of the fixed flag is cached as true in this new ScopeDescription so that future guards will not be required. Because the value is fixed it can be read directly from the model state so the created scope description is then used as the basis for a restriction constructed from the trace. No scopes are already constructed for the start, and the end uses the already constructed scopes as discussed earlier. The resulting scope description is added to the set of scope descriptions to return.

For the case that the flag is false a scope description is created from the target scope description to wrap the else scope. The value of the fixed flag is cached as false in this new ScopeDescription so that future guards will not be required. Then, the following steps are executed:

- The set of for loops that contain the sample task and can change before the consumer is reached via the current trace is calculated, and instances of these are implemented.
- A guard is constructed to ensure that no set of index values in any existing sample descriptions matches all the index values of scopes this sample task resides in. If the indexes were to match an existing SampleDesc indexes then the sample tasks output value would be the value from that SampleDesc.
- Inside of the guard construct a loop to iterate through all the possible states.
- Inside the body declare a pair of variables:
  - The first to hold the value of the current state which is calculated via a tree provided by the random variable class that turns a numeric value into the corresponding state, for example a Boolean value.
  - The second value takes the probability of the current scope description and combines it with the probability of generating the current sample task value.
- Use these values to construct a new ScopeDescription with a new probability tree and a new SampleDesc for the newly constructed instance of the sample task.
- Constructed a restriction based on the trace starting in the ScopeDescription from the last step and add the resulting ScopeDescription to the set of ScopeDescriptions to return.

An example of the generated code can be seen in FIG. 9.

When the constraint trace is dependent on the output of distribution samples, these samples are constructed first and again in the correct order. In addition it requires the construction of the scopes for the consumer task that the traces end at. Normally this would be constructed when the constraint trace restrictions are generated, but they must be generated before they are used as an end point for the traces from the samples that the constraint trace depends on. This is achieved by calculating the set of scopes that are required by the consumer and removing from it any scopes than cannot change over the course of constraint trace leading to the consumer. These scopes are the scopes between the global scope and the outermost scope that contains an array that is written to and read from. Once all the scopes that need to be constructed are constructed any sample tasks the trace depends on can be evaluated.

As described, a new variable is created and a substitute added, substituting this value for the original value of the sample task in the compilation. If the trace goes via another intermediate value, this alternative value will fail to propagate unless either the intermediate values that are dependent on the result are updated when they are met in the trace, or the other intermediates are also substituted as is done if the passValues flag is set in a call to construct a constraint, as discussed above. The latter option was taken for 5 reasons:

- It does not require logic to reset the value of the model state once the code that uses each update has completed.
- It does not involve updating the model state, so multiple threads can run in parallel.
- It does not involve accesses to arrays, and instead just uses scalar variables on the stack, so should be faster.
- It keeps all the state local to the function making optimizations easier.
- It avoids unnecessary updates to global state where variables that are not consumed by the consumer are updated.

The following discussion provides a description of backward IRTree generation from a trace. When constructing inference code there are times when the question for a trace, if the output of the trace is x, what was the input? To allow the answer to this to be constructed tasks have the method “getBackwardsIR” that takes:

- argPos—The argument that the tree should be constructed for. This is denoted as an integer [0 . . . n) where n is the number of arguments the task takes.
- taskOutput—An IR tree that returns the value that should be considered for the output of the task.
- backTraceInfo—This is an object that holds information about the environment that the tasks trees should be constructed. The information it contains will be discussed more later in this section.
- compilationCtx—The compilation context for the process.

From these it constructs a tree that provides the value of the input based on the value of the output. Starting at the end of a trace this method can be applied to each task in the trace in turn using the output of the previous call as the input to the next.

For most tasks this function is relatively simple. Tasks such as and, min, and array length do not have an inverse function and calls to this function generate an error. Other tasks such as get only have an inverse for some arguments. For example there is no inverse if the required argument is the index as there is no guarantee that the value of the output of the task is unique in the array.

Tasks such as subtraction the operation x=a−b can be rearranged to give the expression a=x+b and b=a−x depending on the argument that should be calculated for. The trees generating the values of a and b as required for the right hand side of these expressions can be produced by calling getForwardIR or the corresponding variables.

To construct the inverse function for the first argument of the expression x=a+b[i], the expression a=x−b[i] is determined. If i is a loop index, this may require knowing the value of i. As discussed above, the loop that provides a given loop index can change as a constraint for a trace is constructed. Each time a put task is met when constructing such a constraint, the loop indexes that provide the current values of the indexes in scope of the put task are saved along with any other variable substitutions at this point. These are stored in the scope description and when getBackwardIR is called on a put task the existing substitutions are removed and the new ones are instantiated. This may only be done for put tasks as the only way to move data out of a scope and into another is to place it in an array and recover it later. Thus when playing through a trace in reverse, new scopes can only be entered by a put task.

It is safe to index the substitutions with the tasks they relate to as the restrictions on arrays mean that each task can only be met once in a given trace. Traces from distributions do add an extra complexity because it may be the case that while the distribution trace matches the constraint trace, any change to the substitutions when applying the distribution trace may be stored. But, if they are stored after the trace has diverged, they may no longer be required to be on the same loop if they meet the same task. To prevent this, when these constraints are constructed, in addition to providing the trace to construct a constrain for the distribution, the trace that was used to instantiate the scope constructor is also provided and these are used to calculate the set of put tasks that appear before the traces diverge. This relies on a constraint being constructed before the inverse tree is constructed, but as the relationship needs to be confirmed before the tree based on it is constructed, this is the case.

The second class of tasks that are handled differently are put and get tasks. Naively these tasks can be replaced with each other, but for gets this will result in the value being written into the model state only to be read out again later. To avoid this corruption of the global state, in some embodiments a stack is added to the backTraceInfo object that holds the values output by get tasks that have been met on the trace, and a method added to check that the stack is empty at the end of the trace. When a get task is reached, the expected output is pushed onto the stack and a load of the array returned as the tree. When a put task is reached if there is a stored value in backTraceInfo, the value is popped off the stack and returned, otherwise a get is constructed to read the indexed value from the returned array. This data structure could be simplified to an integer count and a field to store the first element pushed onto the stack as all the other values are discarded without being read, but it was felt that the stack made for a clearer interface.

Once the Intermediate Representation trees "IRTree structures" are created before they are output as code they are first converted into a Transformation Tree "TransTree" and in this state transformations can be applied to restructure the tree while maintaining its functionality. As with the IRTrees, TransTrees are immutable and each node in the tree can only appear in the tree once. There are a number of optimizations with plans to add many more. Each of these optimizations is applied in turn, and this is iterated until an iteration is achieved that does not make a change to the structure of the tree.

The transformations are facilitated via a pair of methods that implement variants of the visitor pattern. The first is "traverseTree" that takes a "TreeVisitor" and calls the "visit" method in this object for every child tree of the current tree. The second method "applyTransformation" takes a Transformer and calls the "applyTransformation" method for every child tree. This method returns a new tree that generates the same type of output such as void, boolean, double etc. Using the results of these method calls it then generates and returns a new tree node. This means that a visitor that just calls visit on the passed node will visit every node, and a transformer whose calls to applyTransform just call transform on the passed tree will copy the tree. As a sanity check the set of visited nodes is recorded to ensure that each node is visited, and that each node in a tree appears only once. By extending the visitor and transformer classes to perform more than the boilerplate functionality transformations are implemented.

Figure 10:
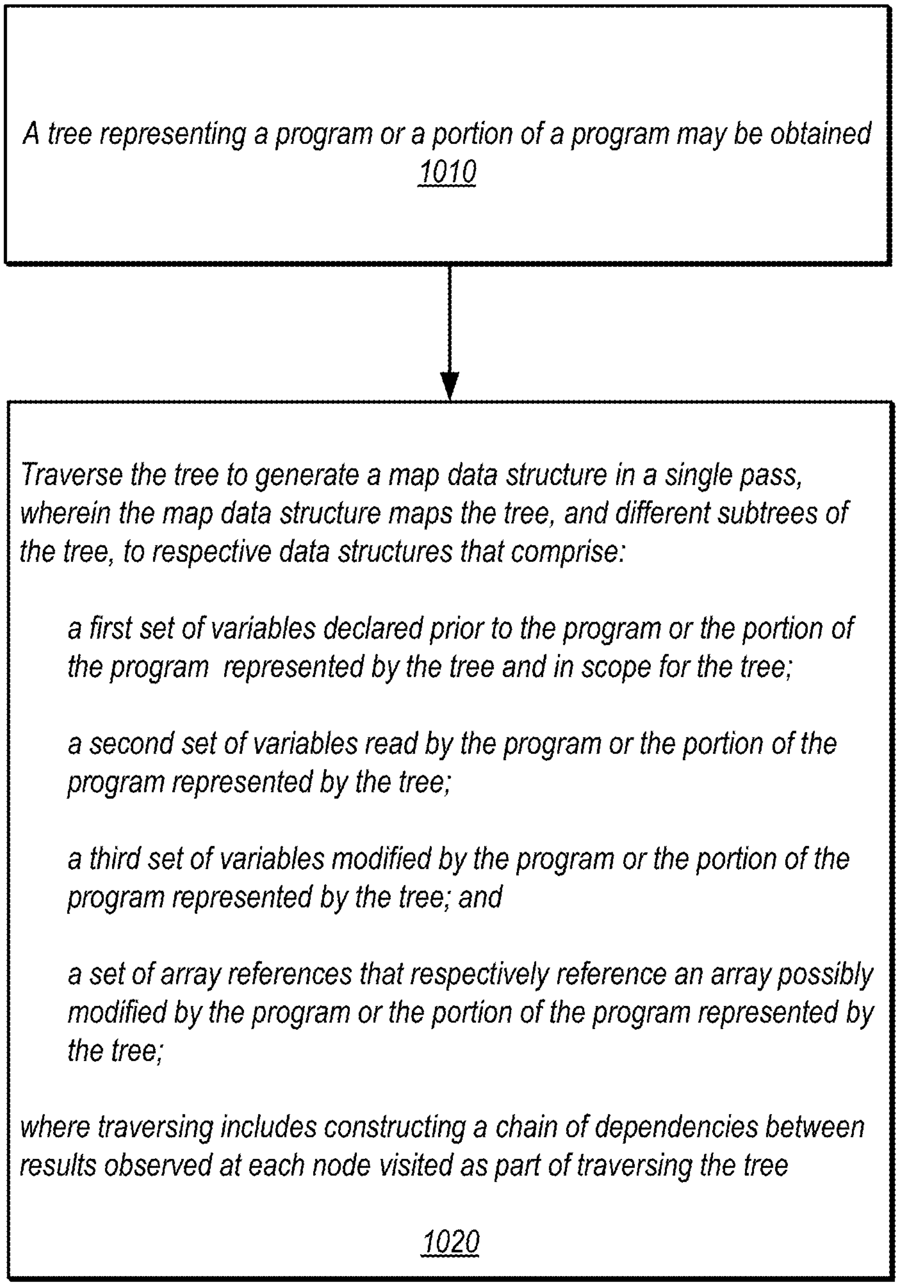
FIG. 10 is a high-level flowchart illustrating various methods and techniques is a flow diagram illustrating methods and techniques to generate a map structure for optimizing a tree representing a portion of code in a target programming language in a single pass traversal, according to some embodiments.

FIG. 10 is a high-level flowchart illustrating various methods and techniques to generate a map structure for optimizing a tree representing a portion of code in a single pass traversal, according to some embodiments. As indicated at 1010, a tree representing a program or portion of the program may be obtained, in some embodiments. For example, the tree may be obtained from a compiler that compiled code for the program (or portion of the program, determined or obtained from one or more API calls to generate the tree, or read from storage location. In some embodiments, the tree may be determined from or obtained by an interpreter to execute code that specifies the program or the portion of the program As indicated at 1020, traverse the tree to generate a map data structure in a single pass, wherein the map data structure maps the tree, and different subtrees of the tree, to respective data structures that comprise:

- a first set of variables declared prior to the program or the portion of the program represented by the tree and in scope for the tree;
- a second set of variables read by the program or the portion of the program represented by the tree;
- a third set of variables modified by the program or the portion of the program represented by the tree; and
- a set of array references that respectively reference an array (e.g., which may be the same or different arrays) possibly modified by the program or the portion of the program represented by the tree.

The traversing of the tree may include constructing a chain of dependencies between results observed at each node visited as part of traversing the tree, in some embodiments.

Key to many optimizations is the ability to determine if: A value stored in a variable is read; And which writes to a variable a read could be returning. To this end a visitor is used to build a "VariableTracking" structure that describes for each subtree in the tree: Which variables are in-scope; Which variables are read from; Which variables are written to; And which arrays are modified.

When storing this information writes and modified arrays are stored as sets of variable names.

The in-scope variables and read variables are stored in ScopedVarSet 1106 which map between variables names and VarDef objects 1108. VarDef objects 1108 contain the tree id of the declaration location and the ids of the trees that could of performed the last write to the variable plus some information on the path from each write to the current location. Only one of the trees will have performed the last write in any given instance, but which one may depend on runtime information. The results from this visitor are conservative and may report possible modifications that closer examination of the logic of the tree reveal to be impossible, but the visitor will not fail to report a possible modification.

Figure 11:
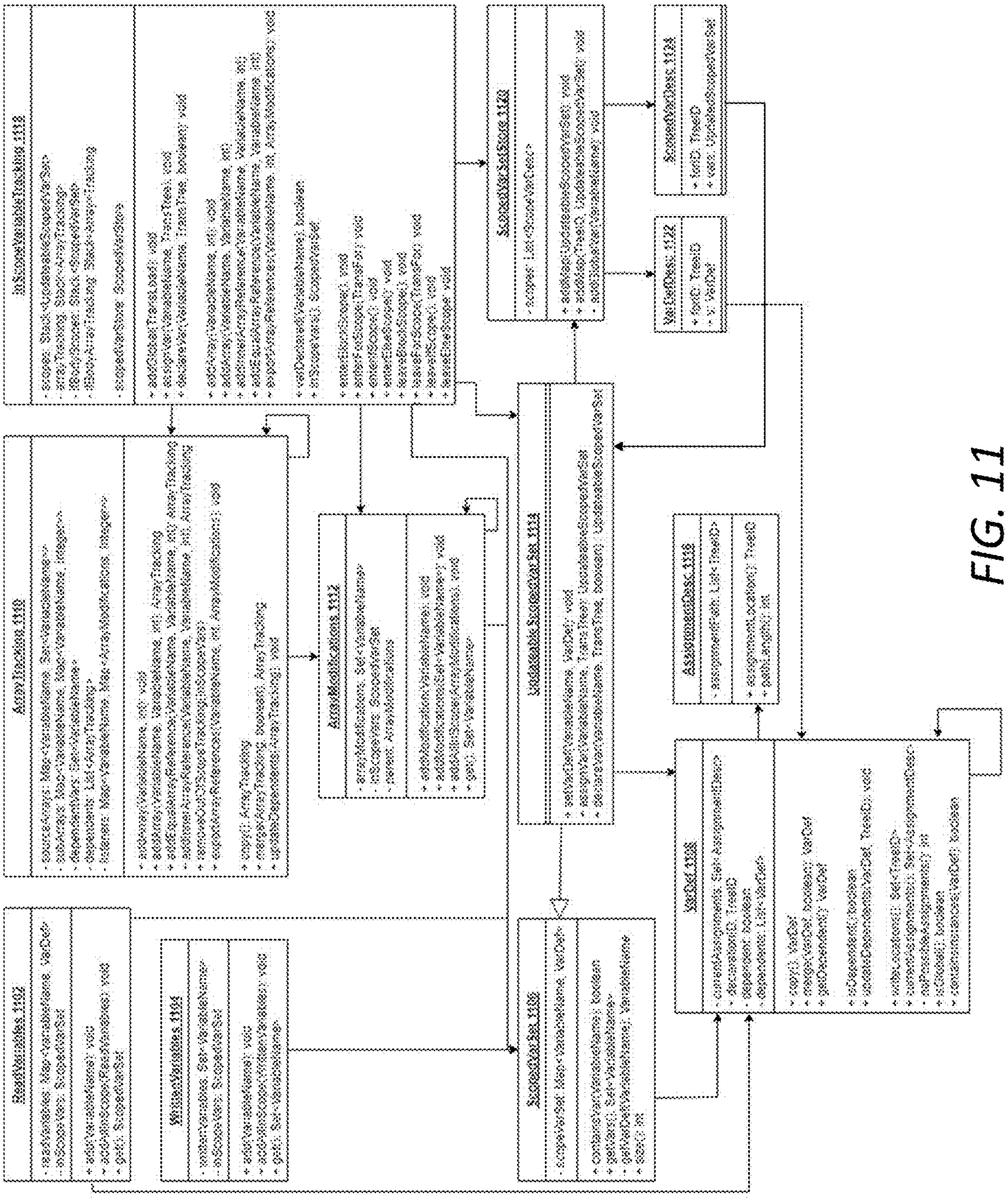
FIG. 11 is a unified modeling language (UML) diagram illustrating relationships between different objects for traversing a tree representing a portion of new code, according to some embodiments.
Figure 12:
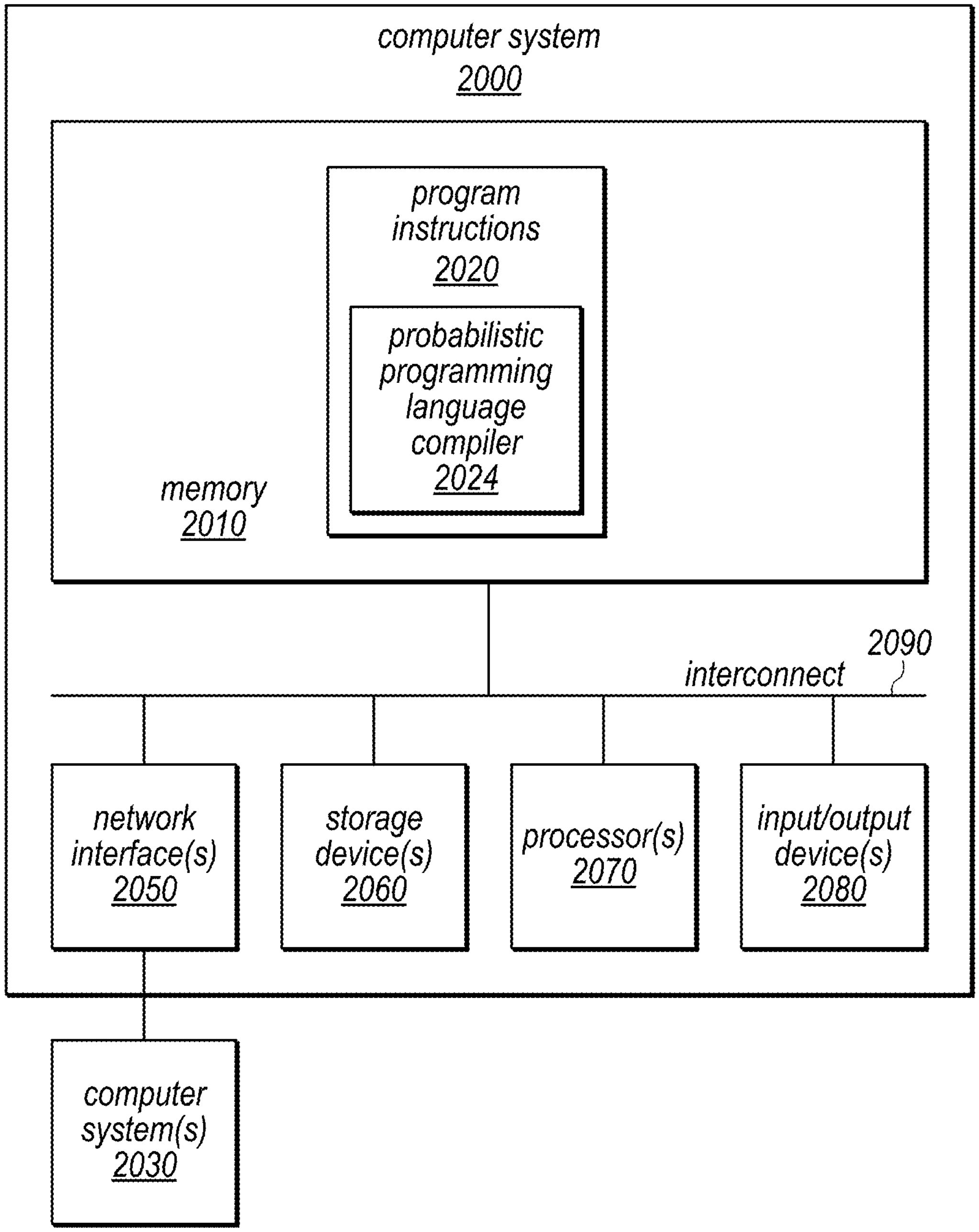
FIG. 12 illustrates an example computing system, according to some embodiments.

The visitor updates 4 data structures as it traverses the tree, these in turn call to other helper classes and can be seen in FIG. 11 which is a unified modeling language (UML) diagram outlining the structure of the support classes for the variable tracking visitor class. These 4 data structures are:

An "InScopeVariableTracking" object 1118. This object tracks the variables that are currently in scope and the references to arrays that are referencing the same array.

A stack of "ReadVariables" objects 1102. Each ReadVariables object 1102 constructs a ScopedVarSet 1106 mapping read variable names to the corresponding VarDef 1108 for that variable. One of these objects is constructed for each subtree.

A stack of "WrittenVariables" objects 1104. Each WrittenVariables object 1104 constructs a set of variable names holding all the variables written to. One of these objects is constructed for each subtree.

A stack of "ArrayModifications" objects 1112. Each ArrayModification object 1112 constructs a set of references to arrays that are modified. One of these objects is constructed for each subtree.

When they are constructed each ReadVariables 1102, WrittenVariables 1104, and ArrayModifications object 1112 takes as a parameter a ScopedVarSet object 1106 describing the available variables and their state. This is provided by the InScopeVariableTracking object 1118.

In some embodiments, there are a number of restrictions on the trees that interact with arrays that can be handled by this visitor. These restrictions may be used for defining the scope of read write tracking and may include:

Variable names cannot be overloaded. This restriction could be removed by adding declaration id tracking to the written variable and modified array sets, but as generated non-probabilistic programming language code does not have overloaded variables this has not been included.

Multiple global references cannot point to the same array as there is no way for the local code to know that the two sets of references refer to the same array.

There must not be memory leaks, so at least 1 reference to the outer most array must be kept at all times. This restriction could be weakened, but code with memory leaks is faulty and should not be generated.

References to the same array cannot be placed into multiple different arrays. In different embodiments, references can be placed into multiple different arrays.

Each time a node is visited the ScopedVarSet 1106 containing the in-scope variables is generated and a new ReadVariables object 1102, WrittenVariables object 1104 and ArrayModifications object 1112 is pushed onto the corresponding stack. The set of in-scope variables is calculated before the rest of the tree is explored to ensure that additional values are not added to it by the tree being explored. Once the tree has been explored, the ReadVariables 1102, WrittenVariables 1104, and ArrayModication objects are popped off the top of the stacks now containing any read, written, and modified variables. The ScopeVarSet, and the output of the 3 objects are then added to the VariableTracking object with the current tree as an index.

As the tree is explored values must be added to the read, written, and in-scope objects. This is done as follows. For in-scope variables, The in-scope variables are stored inside the InScopeTrackingObject in a ScopedVarSet object 1106. Each time a modification is required to the ScopedVarSet 1106, a new copy of the object is created so that outside of the InScopeTrackingObject these classes appear immutable. The exception to this immutability is when global variables are encountered. Modifications to ScopedVarSets 1106 are performed via the local subclass "UpdateableScopedVarSet" 1114.

When a variable declaration node or a for loop node is met a VarDef 1108 is created for the named variable/loop index and is stored in the current ScopedVarSet 1106 inside the InScopeVariableTracking object 1118. If the variable is not initialized the set of possible write locations in the VarDef 1108 is left empty, otherwise it is set to the current TreeID.

When a store node is reached, a new VarDef 1108 is constructed with the set of last write locations set to contain just the current TreeID. This new VarDef 1108 is added to the current ScopedVarSet 1106. If the value being stored is not currently in the ScopedVarSet 1106 it must be a globally declared value. This will trigger the addition of a global variable as described below.

For reads, every time a load is encountered a check is made to test if the variable name is in the current in-scope ScopedVarSet 1106. If the named variable is not present, the variable must be a global variable whose value was assigned at some point outside of the current function and is being met by the tree for the first time. The variable is added as discussed below. Once this check has been performed the variable name is added to the ReadVariables object 1102 where it can be used to reference the VarDef 1108 in the local in-scope variables. The VarDefs 1108 that were passed when the ReadVariables object 1102 was created are used because these only contain the writes the subtree is dependent on, and not any writes that are performed within the subtree.

For writes, when a store node or a declaration node with an initial value is met, the name of the variable is added to the set of write values.

After a tree has been explored the values in the ReadVariables 1102 and WrittenVariables 1104 are popped off the stacks and merged into the corresponding objects for the parent tree which are now at the top of the corresponding stacks. In the case of WrittenVariables 1104 and the yet to be covered ArrayModifications 1112 this is just adding the set of variable names from the popped objects that are also in scope for this tree, i.e. are declared in the inScopeVars field in the object they are being added to.

For reads this is more complex as each variable maps to a VarDef 1108 that records where the set of possible locations that the variable was last written to. Trees can only read from the variables that are in scope, so when the read variables are merged back in the following actions are performed to merge each variable:

Check if the variable name is in the in scope variables. Like with WrittenVariables 1104 and ArrayModifications 1112, if it is not this variable was declared inside the child tree and should not be included in the read variables for this tree.

Check if the possible set of write locations in the read variable VarDef 1108 is a superset of the set of write locations in the corresponding in-scope VarDef 1108. If it is not this read happened after an assignment to the variable in the child tree, and so the read should not be recorded for this tree.

If both these conditions are satisfied add the variable to the ReadVariables object 1102 using the VarDef 1108 from the in-scope mapping the ReadVariables 1102 was initialized with, as any reads of values assigned in a child tree should not be recorded in the parent. How VarDef objects 1108 with more that one assignment point occur will be discussed in further detail below.

As programs are assumed to be correct if a load or store of a variable that is not currently in-scope is performed it is assumed to be a global variable. A VerDef is constructed for these using a special tree id value to mark the declaration location and write location as global. This value will be in scope for all the trees that have been already processed, so references to all the generated ScopedVarSets 1106 are kept the InScopeVariableTracking object 1118 so that global variables can be added to them. "ScopedVarSetStore", "VarDefDesc", and "ScopedVarDesc" are helper classes declared and used in InScopeVariableTracking 1118 for this functionality. As the ScopedVarSets 1106 are held by the data structures that are going to be returned this has the effect of updating all the scopes we have constructed so far.

Arrays introduce 2 additional points for consideration: The first is that because there are many different elements in an array, an assignment to an array does not have to overwrite the previously saved values. The second issue is caused by the fact that variables for arrays are holding references instead of values. As such multiple variables may point to the same array, or subsection of an array. For example if c is declared as "int[ ][ ]b=a[i]; int[ ]c=b[j]; int[ ][[ ][d=a;" then writes to c will need to be recorded for a, b, c, and d.

Because of this, WrittenVariables 1104 will record modifications to the references to arrays, but the separate object ArraysModifed is constructed to record which references point to arrays that may have been modified by a tree. To determine which arrays may have been modified requires the set of references to the same array to be tracked, and this is the function of the ArrayTracking object 1110 held by the InScopeVariableTracking object 1118. In some embodiments, ArrayTracking objects 1110 are immutable for most operations, producing new ArrayTracking objects 1110 instead.

The ArrayTracking class maintains 2 maps:

The first from variable names for array references to the set of variable names that reference the same array, but with the highest dimension array type array type of all the references to the array. So for the earlier example, it would contain the 4 entries "c→{a, d}, b→{a, d}, a→{a, d}, and d→{a,d}". These entries may be called source arrays.

The second map is from source arrays to maps from sub-array references to the highest dimension that sub-array is assigned to a source array at. This is not the dimension of the reference type, but the dimension of the value assigned. For example the assignments "d=a; d[i]=a[i]; and d[i][j]=a[i]j[j];" will have the dimensions 3, 2, and 1 respectively of which the dimension 3 will be stored. The maps will include the source array, so for this example the map would be "{a→{a→3, b→2, c→1, d→3}, d→{a→3,b→2, c→1, d→3}}".

Arrays are modified by array put nodes. For this example, consider the statement "b[i]=e". When one of these is encountered the first step is to identify the array being modified. To achieve this when the tree providing the array is visited a flag is set in the visitor to tell it to record the variable name of the load node it encounters. The array can be provided by either a load or an array get. In the later case, the flag is unset while the index is explored to ensure it is the name of the array that is saved, not the source of the index. If this value is a previously unmet global variable it will be added to the ArrayTracking at the point the load is met. If for example b in the example was a global being met for the first time this would result in the entries "b→{b} and b→{b→2} being added to the ArrayTracking maps.

Having determined the variable name of the array, b, the dimension of the interaction is found by querying the output type of the tree returning the value, in this case 1. With these two values the ArrayTracking object 1110 can add the references that are modified into the ArrayModifications object 1112. To do this, the array name is used to recover the set of source arrays from the first map, {a, d} The sub array maps for each of these is recovered and a set constructed containing the variable names where the associated dimension is larger than the recovered dimension. In this case, the set will be {a, b, d}. c is not included in the set as it cannot be modified in this interaction as it was an array of ints, not an int that was assigned to the array.

If the value being placed into the array is a load of another array, the loaded array needs to be added to the maps after the set of values to return has been constructed. This will add e→{a, d} to the source arrays map, and e→1 to subarray maps for a and d.

References to arrays can be updated in a number of different ways, which may be referred to in the following cases:

1. "b=a[j];": The reference "c" should become a sub-array of the array "a" which may itself be the subarray of another array.
2. "b=a;":
   - (a) If "a" is not a source array "b" should just be added as a sub-array.
   - (b) If "a" is a source array, "b" should be added as an additional source array
3. "b=new int[i];": "b" should be added as an array with no relation to other references.

The first step for all of these cases is to remove any existing entries in the array tracking maps for the reference being assigned to. This can be done with the following steps:

Copy the ArrayTracking object 1110 in order to maintain the immutability of observed ArrayTracking objects 1110.

Remove the entry in the source array map for the reference saving the set of source arrays.

For every source in the saved set the, corresponding map in the subarrays map has the reference to be removed deleted from the map.

If the set of sources contains the reference to be removed:

Remove the corresponding map from the subarrays map and save the keyset.

For every entry in the keyset look up the set in the set in source arrays and remove the reference from the set of source arrays.

Having removed any old references from ArrayTracking the new data is added for each case as follows. For cases 1 and 2a the steps are the same as in the previous section when an array is stored in another array. A new entry with "b" pointing to the sources of "a" is added to source arrays. For each source array a new entry in their corresponding subarrays map is added mapping "b" to the dimension of "a[j]" and a respectively. For case 2b the existing sources for a are recovered from the source array map, and a new set is constructed containing the existing entries and "b". The map of subarrays for "a" is recovered from the subarray map and a new map is constructed holding the existing entries, and a new entry mapping "b" to the dimension of "a". For each key in the newly constructed map, and entry pointing to the new set is added to the source array map. For each value in the new set an entry is placed into the subarray map pointing to the newly constructed map. For case 3 the new array is initialized in the same way as the loading of a global array with the entries for this case of "b→{b}" and "b→{b→1}".

As the visitor traverses the tree it will pass through scopes such as the bodies of for and if-else statements. Outside of these scopes variables declared in the scope should not be recorded as read, written to, array modifications, or in scope.

The discussion that follows provides details for how this may be implemented for block scopes before considering conditionals and iteration.

As already covered ReadVariables 1102, WrittenVariables 1104, and ArraysModified are all initialized with a ScopedVarSet object 1106 describing the variables in scope. When a child tree is traversed and added the entries it has collected to these classes they are altered to only include entries that are in scope for the parent tree. And as also already covered ReadVariables 1102 will only include a read if the corresponding VarDef 1108 is a superset of the in-scope VarDef 1108. If it is it will use the local VarDef 1108 as reads of writes defined in the child tree should not be recorded.

Tracking of in-scope variables is more complex as while some values will move out of scope and should be discarded others will be updated and the changes must be kept, so just having different versions of the InScopeVariableTracking object 1118 that are discarded upon leaving the scope is insufficient in such scenarios. When entering the scope the method enterScope is called on the InScopeVariableTracking object 1118. This creates a new UpdateableScopedVarSet object 1114 to hold the state of the in scope variables, populates it with the current state of the current UpdateableScopedVarSet object 1114. This can be pushed onto a stack that holds an object for each scope entered.

When leaving the scope both the current UpdateableScopedVarSet object 1114, the innerVars, and the previous one that represents the variables that were in scope when block scope was entered, the outerVars, are popped of the stack and the following steps taken to complete the custom behavior for a block scope. The ArrayTrackingObject is copied and any references to arrays that are not declared in outerVars are removed from new the ArrayTracking object. A new UpdateableScopedVarSet object 1114 is created, this contains the definitions from the innerVars for the variables that are declared in the outerVars. For example if outerVars contains "{a→vda, b→vdb}" and innerVars contains "{a→vda-changed, b→vdb, c→vdc}" the new UpdateableScopedVarSet object 1114 will contain "{a→vda-changed, b→vdb}". This new object is pushed onto the stack.

In various embodiments, conditionals can be either just an if, or an if-else. In either case, if there are assignments inside one or both of the conditional branches and at the end of the conditional these need to be merged either with each other, or with the state before the conditional. This effects both the in-scope variables and the array tracking. Merging a pair of VarDefs 1108 just requires taking the union of the assignment locations as the declaration location may be the same. Merging ArrayTracking objects 1110 is complicated by dimensions. The source array maps are merged by combining the two maps, and if both maps contain an entry for a given variable name constructing a new set containing the union of the existing sets. For the subarray maps, the process is similar, but now if there is a collision on a name, and the corresponding dimension maps also contain a collision, the largest dimension may be used in the resulting map. For example the entries "a→{a→3, b→2}" and "a→{a→3, b→1, c→1}" will map to "a→{a→3, b→2, c→}".

The enter and leave scope calls that are made before leaving the bodies of the if and the else component are modified from those used for block scopes. The change to the enter scope methods is the creation of a new ArrayTracking object 1110 copying the current one. This is pushed onto a stack, that like the stack for variables, holds the ArrayTracking objects 1110 for the InScopeVariables object.

In the leave scope methods the UpdateableScopedVarSet object 1114 and the ArrayTracking object 1110 are handled as follows.

When leaving the "if" body:

The UpdateableScopedVarSet object 1114 used during the traversal of the body is popped off the stack and stored on the separate ifBodyScopes stack for use once the else body has been traversed.

The ArrayTracking object 1110 used for the traversal of the body is popped off the stack, as before out of scope variable names are removed, and it is stored on the separate ifBodyArrayTracking stack for use once the else body has been traversed.

When leaving the scope of the else body in-scope variables are handled as follows:

The following UpdateableScopedVarSet objects 1114 are removed from theirs stacks: The state before the tree was traversed, the outerVars; The state after the if body had been traversed, the ifVars; And the state after the else body had been traversed, the elseVars.

A new UpdateableScopedVarSet object 1114 is created to use after the from now on, newVars.

For every variable defined in outerVars the VarDefs 1108 are recovered from the ifVars and elseVars objects.

If the VarDefs 1108 are the same object then the variable has not been updated and the VarDef 1108 is added to newVars.

If the VarDefs 1108 differ at least one has been updated, so a new VarDef 1108 is constructed by merging the existing VarDefs 1108. This new value is added to newVars.

The newVars object is pushed onto the in-scope vars stack.

When leaving the scope of the else body array tracking is handled as follows:

The else body ArrayTracker is popped from the stack and any out of scope variables are removed.

The if body ArrayTracker is popped from its stack.

The ifBody and else body ArrayTrackers are merged and the result is pushed onto the array tracker stack, so passing on any changes potentially made in the conditional.

The following example considers the application of traversal techniques with respect to code that incorporates a "for loop". Consider the example of code (Example Code 2) below:

```
int a = 2;
int[ ] x = y;
for(int i=0; i<n; i++) {
   int b = a;
   if(i%2==0)
         a = i;
   int c = a/i;
   x[i] = i;
   x = z;
}
```

In Example Code 2, if the iteration runs for 0 or 1 iteration its behavior is the same as a conditional, but it has to be assumed it may run for more than 1 iteration, and this presents 3 new problems:

The value of a read by the line "int b=a;" could either be the value set by the line "int a=2;" which is in scope when the line is processed, or the value set by the line "a=i;" which is yet to be encountered by the visitor, and so is not currently stored in the ScopeVarSet object. As this value was not in the ScopeVarSet, the in scope and read variables for the child trees will not have been reported completely.

Likewise the additional arrays modified when x is written to by the line "x[i]=i;" are y and z, but z has not been met by the visitor yet so is not in the ArrayTracking. As this value was not in the ArrayTracking the modified arrays will not have been reported completely.

The value of a read by the line "int c=a/x[i];" could be the value set by the line "int a=2;", the line "a=i" from this iteration, or the same line from an earlier iteration. These last 2 assignments need a means of distinguishing between the two assignments.

The first two issues are overcome by the creation of listener relationships that allow changes once the for loop has completed to be propagated to objects created during the traversal of the for loop body.

With regard to case 1, VarDefs 1108 are extended with a list of VarDef 1108 listeners. Whenever the VarDefs are copied or merged, if the source VarDef 1108 was a listener then the new VarDef 1108 is a listener to the source. This creates chains of dependencies between the VarDefs 1108 that can only be broken by the creation of a new VarDef 1108 when a value is assigned to a variable. The initial listeners are created when the for loop scope is entered. A new ScopedVarSet 1106, innerVars is created containing the variables that are currently in scope, the values in outerVars. For each variable a new VarDef 1108 is constructed and added as a listener to the VarDef 1108 in the outerVars. When the scope is left for each variable the VarDefs 1108 in the innerVars and outerVars are compared. If the VarDefs 1108 have changed then the changes are added to the listeners of the outerVars VarDef 1108. From here they are propagated to all the other VarDefs 1108 created by copies and merges from this VarDef. 1108 As the read and in-scope variables hold the VarDefs 1108 directly, these changes also propagate to these results. Upon leaving the for scope a new ScopedVarSet object 1106 is created again for each variable, afterVars. The VarDefs 1108 in this object are constructed by merging the VarDef 1108 from the outerVars and the VarDef 1108 from the innerVars. For performance reasons this new VarDef 1108 will only be added to the outerVars VarDef 1108 as a listener as otherwise the number of propagation calls is exponential with the number of nested for loops instead of being linear. To further prune the number of calls the VarDefs 1108 also record if they are a listener and VarDefs 1108 from copies and merges are only listeners if their parents are listeners.

Global variables that are first met inside the body of a for loop add an additional complexity as they will trigger the creation of a VarDef 1108 for the variable in every UpdateableScopedVarSet object 1114 created by the visitor thus far, however the created VarDef 1108 will not have the required listener structure. For this reason the MapStore tracks the last seen for loop, and annotates each added ScopeVarSet with this ID. When creating VarDefs 1108 for the global variables a VarDef 1108 is created each time a new for loop is met. This simplified structure works because we know that the variable has yet to be written to in the tree. If the for loops have already completed, the earlier VarDefs 1108 are unreachable, and if a for loop has not completed and updates the variable, the additional assignment must be passed to the VarDefs 1108 created since the start of the for loop.

With regard to case 2, this is implemented differently because the data is not just held in VarDef objects 1108, but the approach is the same. Each time an ArrayModifications object 1112 has its content added to the ArrayModifications 1112 of a parent tree, it sets the parent trees ArrayModifications 1112 as a listener so if any additional modifications are added these can be propagated. Similarly every time an ArrayModifications 1112 is populated by an ArrayTracker the ArrayTracker saves the ArrayModification 1112 and its query as a listener that can be updated if the ArrayTracker is updated. Finally each time an ArrayTracking object 1110 is copied or merged, the new ArrayTracking object 1110 is registered as a listener to its parents. When entering a for loop a new ArrayTracking object 1110 created by copying the current ArrayTracking object, "outerTracking". when the loop completes, a new ArrayTracking object, afterTracking is created by merging outerTracking, and the ArrayTracking object 1110 generated by the loop body. Finally all the changes are propagated by merging any differences between afterTracking and outerTracking into all the ArrayTracking objects listening to outerTracking.

Because ArrayTracking is tracking all arrays, not just a single variable as is the case for VarDefs 1108 the chains of listeners cannot always be broken by a single assignment. To protect against unrequired updates, a set of variable names that should be updated is maintained in each ArrayTracking object. If a reference is assigned to it is removed from the this set, and any updates to variables not in this set are not passed on to listeners.

The third case is overcome by modifying the VarDef class 1108 so instead of just storing the TreeIDs of the assignment locations the class AssignmentDesc 1116 is used instead. This class holds a list of TreeIDs, the first of which is the location that the assignment was made at, the later ones are the TreeIDs of the for loops that have been reentered since the assignment was made. These are formed when the modified VarDefs 1108 are merged into the listeners of the outerVars object. The loop ids are ordered from the inner most for loop to the outer most loop that was reentered. They do not form a comprehensive list of reentry patterns as for 2 nested loops this list could be an infinite set, but they do include all the loops that could appear in such a pattern.

The example techniques discussed above may useful in many different scenarios. For example, tree rearrangements are supported for comparisons except not-equals. Currently this is restricted to expressions where the focal variable only appears once in the expression. This means that "3=2x+1" can be rearranged, but "3=x+x+1" and "3−x=x+1" cannot. This restriction is overcome to an extent by some of the methods used to simplify expressions which will group and cancel terms.

The utility takes as arguments the expression and the name of the variable to try to make the focus of the expression. This is done by constructing the set of read variables for each subtree as discussed above. The two sides of the comparison are then examined to see if only 1 of them contain reads of the required variable. If none or both of the subtrees contain reads of the variable the expression cannot be rearranged and null is returned. The side which reads the variable is saved as the simplifiedExpression, and the other side is saved as the residualExpression. Then until the simplifiedExpression becomes a load operation each operation on the simplifiedExpression is examined. If just 1 tree reads the focus variable that tree will become the simplifiedExpression and the residualExpression will be updated by applying the inverse operations. For the example "3=2x+1" this will go through the following steps: "(3, 2x+1)", "(3−1, 2x)", $$“\left(\frac{3-1}{2}, x\right)”.$$

As with the initial test if more than one tree reads the focal variable null will be returned.

Inequalities add an extra restriction because multiplication or division by a negative number will invert the direction of the inequality. To overcome this when these operations are met, the value of the tree being applied is tested and if the value is not a constant null is returned. If it is a constant and is negative a flag tracking the direction of the inequality is flipped, and this flag will be checked when constructing the final returned expression. It is planned to weaken this limitation further by using the min and max value calculations to determine if a value is known to be always less than or greater than zero. If the constant equals zero null is returned as the value of the focal variable is not defined by the expression. This case should not occur as the collapse constants transformation should have already removed such terms.

Code that can take the form:

```
for(int i = start; i < end; i += step)
{
  if(i == f(x) && y) {
    [body]
  }
}
```

Can be rewritten as:

```
{
  int i = f(x)
  if(i >= start && i < end && 0 == (i – start) % step && y){
    [body]
  }
}
```

This transformation performs this rewrite allowing the removal of the for loop. To do this it examines every for loop to see if the body is an if else statement where the else is a NOP. When a for loop with a body like this is found before the condition on the if else is transformed the index name of the for loop is set as a target variable name that an equality should be rearranged to provide a value for. The guard is then transformed. If during the transformation of the guard a negation or an or is encountered a flag is set to mark that while the children of either of these trees are being transformed the value of the index cannot be computed. If an equality is found and this flag is not set at the time an attempt is made to rearrange it to the form indexName= . . . If this succeeds the resulting tree is stored for later, this storage also acts as a flag to stop other equalities being rearranged. Once the transformation of the guard completes if a suitable tree has been constructed it is used to perform the above rewrite.

This transformation assumes that the value f(x) can be read immediately, but it is not hard to imagine a case where there is a guard to check the value being read is in range before the value is read. Currently there is no protection for this, and it would cause an array out of bounds error. At the moment it is not possible to generate code that does this, but if that changes in the future some thought will have to be given to additional protections.

If a for loops index is not used the for loop can be removed and replaced with a guard to check if the loop could ever execute. This is not an optimization that would be valid in regular code, but it is valid in single assignment code, and compiler generated code must be constructed with this in mind. This optimization is achieved by generating all the read and writes in the tree and then for each for loop querying if the loop index is read in the body of the for loop. If it is not the body is instead encapsulated in a guard. For incrementing loops this guard will either be start<end+1 or start≤end with the collapse constant transformation applied. The guards are as follows because loops in TransTrees have the range [start . . . end] and the later form may collapse better. Which guard to use is determined by measuring the size of the tree after the constants have been collapsed. For decrementing loops the guard is always start≤end.

This transformation removes scopes from the tree that are not required in order to improve readability. For if else, for and block scope trees the bodies of the trees are transformed, and if the resultant tree type is a block scope that the tree is replaced with the body of the block scope. This has the effect of removing the outermost block scopes as they are not required given the implicit block scope provided by the if else, for, and block scope nodes. The transformation of block scopes has one additional feature, if the tree is the outermost node the block section is also removed as there can be no code outside of it.

Transformations of sequential blocks are done in reverse order. For each tree the tree is first transformed. If the result is a block scope the set of locally declared variables is checked, if any of these appear in the complete set of variables declared in the already processed trees, the block scope needs to remain, otherwise it can be removed. Once the tree has been processed the complete set of declared variables is added to the set of variables already declared in the tree before the next tree is visited.

FIG. 12 illustrates a computing system configured to implement the methods and techniques described herein, according to various embodiments. The computer system 2000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing online post-processing in rankings for constrained utility maximization, as described herein, may be provided as a computer program product, or software, that may include a non-transitory, computer-readable storage medium having stored thereon instructions, which may be used to program a computer system (or other electronic devices) to perform a process according to various embodiments. A non-transitory, computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 2000 may include one or more processors 2070; each may include multiple cores, any of which may be single or multi-threaded. Each of the processors 2070 may include a hierarchy of caches, in various embodiments. The computer system 2000 may also include one or more persistent storage devices 2060 (e.g. optical storage, magnetic storage, hard drive, tape drive, solid state memory, etc.) and one or more system memories 2010 (e.g., one or more of cache, SRAM, DRAM, RDRAM, EDO RAM, DDR 20 RAM, SDRAM, Rambus RAM, EEPROM, etc.). Various embodiments may include fewer or additional components not illustrated in FIG. 12 (e.g., video cards, audio cards, additional network interfaces, peripheral devices, a network interface such as an ATM interface, an Ethernet interface, a Frame Relay interface, etc.)

The one or more processors 2070, the storage device(s) 2050, and the system memory 2010 may be coupled to the system interconnect 2040. One or more of the system memories 2010 may contain program instructions 2020. Program instructions 2020 may be executable to implement various features described above, including a probabilistic programming language compiler 2024 as discussed above with regard to FIG. 1 that may perform the various compiling techniques, in some embodiments as described herein. Program instructions 2020 may be encoded in platform native binary, any interpreted language such as Java™ byte-code, or in any other language such as C/C++, Java™, etc. or in any combination thereof.

In one embodiment, Interconnect 2090 may be configured to coordinate I/O traffic between processors 2070, storage devices 2070, and any peripheral devices in the device, including network interfaces 2050 or other peripheral interfaces, such as input/output devices 2080. In some embodiments, Interconnect 2090 may perform any necessary protocol, timing or other data transformations to convert data signals from one component (e.g., system memory 2010) into a format suitable for use by another component (e.g., processor 2070). In some embodiments, Interconnect 2090 may include support for devices attached through various types of peripheral buses, such as a variant of the Peripheral Component Interconnect (PCI) bus standard or the Universal Serial Bus (USB) standard, for example. In some embodiments, the function of Interconnect 2090 may be split into two or more separate components, such as a north bridge and a south bridge, for example. In addition, in some embodiments some or all of the functionality of Interconnect 2090, such as an interface to system memory 2010, may be incorporated directly into processor 2070.

Network interface 2050 may be configured to allow data to be exchanged between computer system 2000 and other devices attached to a network, such as other computer systems, or between nodes of computer system 2000. In various embodiments, network interface 2050 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2080 may, in some embodiments, include one or more display terminals, keyboards, keypads, touchpads, scanning devices, voice or optical recognition devices, or any other devices suitable for entering or retrieving data by one or more computer system 2000. Multiple input/output devices 2080 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2050.

Those skilled in the art will appreciate that computer system 2000 is merely illustrative and is not intended to limit the scope of the methods for providing enhanced accountability and trust in distributed ledgers as described herein. In particular, the computer system and devices may include any combination of hardware or software that may perform the indicated functions, including computers, network devices, internet appliances, PDAs, wireless phones, pagers, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A system, comprising:

at least one processor;

a memory, comprising program instructions that when executed by the at least one processor cause the at least one processor to:

generate a plurality of traces of a plurality of operations specified in an input that access data between a start node and an end node, wherein the plurality of operations comprise one or more put operations using a put index variable to set a value in an entry in an array and one or more get operations using a get index variable to obtain the value from the entry in the array;

based on the plurality of traces, generate a code template in a target programming language to test the plurality of operations of the plurality of traces, wherein the code template:

identifies a valid trace in the plurality of traces between the start node and the end node by pairing corresponding ones of the one or more put operations and the one or more get operations and testing for equivalence of index values calculated for the put index variable and the get index variable in respective contexts of the put operations and the get operations, wherein the pairing of the corresponding put operations and the get operations and the respective contexts are determined according to at least a forward pass and a backward pass respectively performed over individual ones of the plurality of traces to construct a set of loops and loop index substitutions that test for equivalence of the index values in the paired corresponding ones of the one or more put operations and the one or more get operations of the valid trace; and for the identified valid trace, add a portion of code in the target programming language into the set of loops that prevents execution of further code placed in the code template for additional valid traces.

2. The system of claim 1, wherein the input is a Directed Acyclic Graph (DAG).

3. The system of claim 1, wherein the portion of code in the target language comprises one or more additional loops that act as guard loops.

4. The system of claim 1, wherein the one or more additional loops are described in a guard description data object created as part of generating the code template.

5. The system of claim 4, wherein a check is performed when creating the guard description object to determine whether more than one constraint trace exists.

6. The system of claim 1, wherein to generate the code template in the target programming language, the program instructions cause the at least one processor to:

identify a put operation of the plurality of operations in a trace that updates a portion of shared state; and instead of adding instructions to modify the shared state, add a local variable declaration to store the value the put operation would assign as local at one or more locations in the code template that correspond to when the value would be calculated; and add instructions to read the local variable declarations instead of the portion of shared state.

7. The system of claim 1, wherein to add the portion of code in the target programming language into the set of loops that prevents execution of further code placed in the code template for additional valid traces, the program instructions cause the at least one processor to:

adding a guard for a conditional assignment reached in the valid trace responsive to the conditional assignment being reached via an if statement of the conditional assignment; or adding a negation of a guard for a conditional assignment reached in the valid trace responsive to the conditional assignment being reached via an else statement of the conditional assignment.

8. A method, comprising:

generating a plurality of traces of a plurality of operations specified in an input that access data between a start node and an end node, wherein the plurality of operations comprise one or more put operations using a put index variable to set a value in an entry in an array and one or more get operations using a get index variable to obtain the value from the entry in the array;

based on the plurality of traces, generating a code template in a target programming language to test the plurality of operations of the plurality of traces, wherein the code template:

identifying a valid trace in the plurality of traces between the start node and the end node by pairing corresponding ones of the one or more put operations and the one or more get operations and testing for equivalence of index values calculated for the put index variable and the get index variable in respective contexts of the put operations and the get operations, wherein the pairing of the corresponding put operations and the get operations and the respective contexts are determined according to at least a forward pass and a backward pass respectively performed over individual ones of the plurality of traces to construct a set of loops and loop index substitutions that test for equivalence of the index values in the paired corresponding ones of the one or more put operations and the one or more get operations of the valid trace; and for the identified valid trace, adding a portion of code in the target programming language into the set of loops that prevents execution of further code placed in the code template for additional valid traces.

9. The method of claim 8, wherein the input is a probabilistic programming language and wherein the target programming language is a non-probabilistic programming language.

10. The method of claim 8, wherein the portion of code in the target language comprises one or more additional loops that act as guard loops.

11. The method of claim 8, wherein the one or more additional loops are described in guard description data object created as part of generating the code template.

12. The method of claim 11, wherein a check is performed when creating the guard description object to determine whether more than one constraint trace exists.

13. The method of claim 8, wherein generating the code template in the target programming language comprises:

identifying a put operation of the plurality of operations in a trace that updates a portion of shared state; and instead of adding instructions to modify the shared state, adding a local variable declaration to store the value the put operation would assign as local at one or more locations in the code template that correspond to when the value would be calculated; and adding instructions to read the local variable declarations instead of the portion of shared state.

14. The method of claim 8, wherein adding the portion of code in the target programming language into the set of loops that prevents execution of further code placed in the code template for additional valid traces comprises:

adding a guard for a conditional assignment reached in the valid trace responsive to the conditional assignment being reached via an if statement of the conditional assignment; or adding a negation of a guard for a conditional assignment reached in the valid trace responsive to the conditional assignment being reached via an else statement of the conditional assignment.

15. One or more, non-transitory, computer-readable storage media, storing program instructions that when executed on or across one or more computing devices, cause the one or more computing devices to implement:

generating a plurality of traces of a plurality of operations specified in an input that access data between a start node and an end node, wherein the plurality of operations comprise one or more put operations using a put index variable to set a value in an entry in an array and one or more get operations using a get index variable to obtain the value from the entry in the array;

based on the plurality of traces, generating a code template in the target programming language to test the plurality of operations of the plurality of traces, wherein the code template:

identifying a valid trace in the plurality of traces between the start node and the end node by pairing corresponding ones of the one or more put operations and the one or more get operations and testing for equivalence of index values calculated for the put index variable and the get index variable in respective contexts of the put operations and the get operations, wherein the pairing of the corresponding put operations and the get operations and the respective contexts are determined according to at least a forward pass and a backward pass respectively performed over individual ones of the plurality of traces to construct a set of loops and loop index substitutions that test for equivalence of the index values in the paired corresponding ones of the one or more put operations and the one or more get operations of the valid trace; and for the identified valid trace, adding a portion of code in the target programming language into the set of loops that prevents execution of further code placed in the code template for additional valid traces.

16. The one or more non-transitory, computer-readable storage media of claim 15, wherein the input is a source programming language.

17. The one or more non-transitory, computer-readable storage media of claim 15, wherein the portion of code in the target language comprises one or more additional loops that act as guard loops.

18. The one or more non-transitory, computer-readable storage media of claim 15, wherein the one or more additional loops are described in guard description data object created as part of generating the code template.

19. The one or more non-transitory, computer-readable storage media of claim 15, wherein, in generating the code template in the target programming language, the programming instructions cause the one or more computing devices to implement:

identifying a put operation of the plurality of operations in a trace that updates a portion of shared state; and instead of adding instructions to modify the shared state, adding a local variable declaration to store the value the put operation would assign as local at one or more locations in the code template that correspond to when the value would be calculated; and adding instructions to read the local variable declarations instead of the portion of shared state.

20. The one or more non-transitory, computer-readable storage media of claim 15, wherein, in adding the portion of code in the target programming language into the set of loops that prevents execution of further code placed in the code template for additional valid traces, the program instructions cause the one or more computing devices to implement:

adding a guard for a conditional assignment reached in the valid trace responsive to the conditional assignment being reached via an if statement of the conditional assignment; or adding a negation of a guard for a conditional assignment reached in the valid trace responsive to the conditional assignment being reached via an else statement of the conditional assignment.

* * * * *